United States Patent
Luke et al.

(10) Patent No.: US 9,437,058 B2
(45) Date of Patent: Sep. 6, 2016

(54) DYNAMICALLY LIMITING VEHICLE OPERATION FOR BEST EFFORT ECONOMY

(75) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 13/559,264

(22) Filed: Jul. 26, 2012

(65) Prior Publication Data
US 2013/0030630 A1  Jan. 31, 2013

Related U.S. Application Data

(60) Provisional application No. 61/511,900, filed on Jul. 26, 2011, provisional application No. 61/647,936, filed on May 16, 2012, provisional application No. 61/534,753, filed on Sep. 14, 2011, provisional
(Continued)

(51) Int. Cl.
*G07C 5/08* (2006.01)
*B60L 1/00* (2006.01)
(Continued)

(52) U.S. Cl.
CPC .............. *G07C 5/0858* (2013.01); *B60L 1/003* (2013.01); *B60L 1/02* (2013.01); *B60L 1/14* (2013.01);
(Continued)

(58) Field of Classification Search
CPC B60L 11/1861; B60L 11/1862; B60L 1/003; B60L 1/02; B60L 1/14; B60L 3/003; B60L 3/0046; B60L 3/0061; B60L 3/0069; B60L 7/06; B60L 7/14; B60L 7/22; B60L 11/005; B60L 11/1803; B60L 11/1822; B60L 11/1824; B60L 11/1838; B60L 11/1842; B60L 11/1846; B60L 11/1848; B60L 11/1851; B60L 11/1857; B60L 11/1874; B60L 11/1877; B60L 15/2045; G06Q 30/0253; G06Q 30/0259; G06Q 30/0261; G06Q 30/0267; G06Q 30/0639; G07C 5/00; H01M 10/425; H01M 10/4257; H01M 10/441; H01M 10/482; H02J 4/00; H02J 7/00; H02J 7/0013; H02J 7/007
USPC .............. 701/22, 123, 208; 165/42; 318/434
See application file for complete search history.

(56) References Cited

U.S. PATENT DOCUMENTS

| 1,387,848 | A | 8/1921 | Good |
| 3,470,974 | A | 10/1969 | Pefine |

(Continued)

FOREIGN PATENT DOCUMENTS

| CA | 2 865 976 A1 | 9/2013 |
| CN | 1211844 A | 3/1999 |

(Continued)

OTHER PUBLICATIONS

Chen et al., "Apparatus, System, and Method for Authentication of Vehicular Components," U.S. Appl. No. 13/918,703, filed Jun. 14, 2013, 84 pages.
(Continued)

*Primary Examiner* — Aaron L Troost
(74) *Attorney, Agent, or Firm* — Seed IP Law Group PLLC

(57) ABSTRACT

Vehicle operation (e.g., speed, acceleration) may be limited based on various conditions such as a current charge condition of an electrical energy storage devices (e.g., batteries, super- or ultracapacitors), history of such, conditions related to the vehicle (e.g., mileage, weight, size, drag coefficient), a driver or operator of the vehicle (e.g., history with respect to speed, acceleration, mileage) and/or environmental conditions (e.g., ambient temperature, terrain). A controller may control operation of one or more power converters to limit current and/or voltage supplied to a traction electric motor, accordingly.

42 Claims, 8 Drawing Sheets

Related U.S. Application Data application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(51) Int. Cl.

| | |
|---|---|
| B60L 1/02 | (2006.01) |
| B60L 1/14 | (2006.01) |
| B60L 3/00 | (2006.01) |
| B60L 7/06 | (2006.01) |
| B60L 7/14 | (2006.01) |
| B60L 7/22 | (2006.01) |
| B60L 11/00 | (2006.01) |
| B60L 11/18 | (2006.01) |
| B60L 15/20 | (2006.01) |
| G01C 21/34 | (2006.01) |
| G01C 21/36 | (2006.01) |
| G06F 3/06 | (2006.01) |
| G06Q 10/02 | (2012.01) |
| G06Q 30/02 | (2012.01) |
| G07C 5/00 | (2006.01) |
| H01M 10/42 | (2006.01) |
| H01M 10/44 | (2006.01) |
| H01M 10/48 | (2006.01) |
| H02J 4/00 | (2006.01) |
| H02J 7/00 | (2006.01) |
| E05B 81/56 | (2014.01) |
| G06Q 30/06 | (2012.01) |

(52) U.S. Cl.
CPC ............ *B60L 3/003* (2013.01); *B60L 3/0046* (2013.01); *B60L 3/0061* (2013.01); *B60L 3/0069* (2013.01); *B60L 7/06* (2013.01); *B60L 7/14* (2013.01); *B60L 7/22* (2013.01); *B60L 11/005* (2013.01); *B60L 11/1803* (2013.01); *B60L 11/1822* (2013.01); *B60L 11/1824* (2013.01); *B60L 11/1838* (2013.01); *B60L 11/1842* (2013.01); *B60L 11/1846* (2013.01); *B60L 11/1848* (2013.01); *B60L 11/1851* (2013.01); *B60L 11/1857* (2013.01); *B60L 11/1861* (2013.01); *B60L 11/1874* (2013.01); *B60L 11/1877* (2013.01); *B60L 15/2045* (2013.01); *E05B 81/56* (2013.01); *G01C 21/3476* (2013.01); *G01C 21/3682* (2013.01); *G06F 3/0608* (2013.01); *G06F 3/0638* (2013.01); *G06F 3/0671* (2013.01); *G06Q 10/02* (2013.01); *G06Q 30/0253* (2013.01); *G06Q 30/0259* (2013.01); *G06Q 30/0261* (2013.01); *G06Q 30/0267* (2013.01); *G06Q 30/0639* (2013.01); *G07C 5/00* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *B60L 2200/12* (2013.01); *B60L 2210/12* (2013.01); *B60L 2210/14* (2013.01); *B60L 2210/30* (2013.01); *B60L 2220/14* (2013.01); *B60L 2220/16* (2013.01); *B60L 2220/46* (2013.01); *B60L 2230/16* (2013.01); *B60L 2230/40* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/642* (2013.01); *B60L 2240/645* (2013.01); *B60L 2240/662* (2013.01); *B60L 2240/70* (2013.01); *B60L 2250/10* (2013.01); *B60L 2250/16* (2013.01); *B60L 2250/18* (2013.01); *B60L 2250/20* (2013.01); *B60L 2250/22* (2013.01); *B60L 2260/44* (2013.01); *B60L 2260/52* (2013.01); *B60L 2270/34* (2013.01); *B60L 2270/46* (2013.01); *H01M 2010/4278* (2013.01); *H01M 2220/20* (2013.01); *H01M 2220/30* (2013.01); *H02J 2007/0001* (2013.01); *H02J 2007/0098* (2013.01); *Y02E 60/12* (2013.01); *Y02E 60/721* (2013.01); *Y02T 10/645* (2013.01); *Y02T 10/7005* (2013.01); *Y02T 10/705* (2013.01); *Y02T 10/7011* (2013.01); *Y02T 10/7022* (2013.01); *Y02T 10/7044* (2013.01); *Y02T 10/7055* (2013.01); *Y02T 10/7072* (2013.01); *Y02T 10/7088* (2013.01); *Y02T 10/7094* (2013.01); *Y02T 10/7225* (2013.01); *Y02T 10/7233* (2013.01); *Y02T 10/7241* (2013.01); *Y02T 10/7258* (2013.01); *Y02T 10/7283* (2013.01); *Y02T 10/7291* (2013.01); *Y02T 10/92* (2013.01); *Y02T 90/121* (2013.01); *Y02T 90/124* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01); *Y04S 50/10* (2013.01); *Y04S 50/14* (2013.01); *Y10T 70/7062* (2015.04); *Y10T 307/406* (2015.04)

(56) References Cited

U.S. PATENT DOCUMENTS

| | | | |
|---|---|---|---|
| 3,664,450 A | | 5/1972 | Udden et al. |
| 3,678,455 A | | 7/1972 | Levey |
| 3,687,484 A | | 8/1972 | Cosby |
| 3,708,028 A | | 1/1973 | Hafer |
| 4,087,895 A | | 5/1978 | Etienne |
| 4,129,759 A | | 12/1978 | Hug |
| 4,216,839 A | | 8/1980 | Gould et al. |
| 4,641,124 A | | 2/1987 | Davis |
| 4,669,570 A | | 6/1987 | Perret |
| 5,187,423 A | | 2/1993 | Marton |
| 5,189,325 A | | 2/1993 | Jarczynski |
| 5,236,069 A | | 8/1993 | Peng |
| 5,339,250 A | | 8/1994 | Durbin |
| 5,349,535 A | | 9/1994 | Gupta |
| 5,376,869 A | | 12/1994 | Konrad |
| 5,491,486 A | | 2/1996 | Welles, II et al. |
| 5,544,784 A | | 8/1996 | Malaspina |
| 5,596,261 A | | 1/1997 | Suyama |
| 5,627,752 A | * | 5/1997 | Buck et al. ............ 701/36 |
| 5,631,536 A | | 5/1997 | Tseng |
| 5,642,270 A | | 6/1997 | Green et al. |
| 5,815,824 A | * | 9/1998 | Saga et al. ............ 701/22 |
| 5,839,800 A | | 11/1998 | Koga et al. |

(56) References Cited

U.S. PATENT DOCUMENTS

| | | |
|---|---|---|
| 5,898,282 A | 4/1999 | Drozdz et al. |
| 5,929,608 A | 7/1999 | Ibaraki et al. |
| 5,998,963 A | 12/1999 | Aarseth |
| 6,016,882 A | 1/2000 | Ishikawa |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,429,622 B1 | 8/2002 | Svensson |
| 6,494,279 B1 | 12/2002 | Hutchens |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,614,204 B2 | 9/2003 | Pellegrino et al. |
| 6,621,244 B1 | 9/2003 | Kiyomiya et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,917,306 B2 | 7/2005 | Lilja |
| 6,952,795 B2 | 10/2005 | O'Gorman et al. |
| 7,010,682 B2 | 3/2006 | Reinold et al. |
| 7,111,179 B1 | 9/2006 | Girson et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,630,181 B2 | 12/2009 | Wilk et al. |
| 7,698,044 B2 | 4/2010 | Prakash et al. |
| 7,728,548 B2 | 6/2010 | Daynes et al. |
| 7,761,307 B2 | 7/2010 | Ochi et al. |
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,098,050 B2 | 1/2012 | Takahashi |
| 8,106,631 B2 | 1/2012 | Abe |
| 8,118,132 B2 | 2/2012 | Gray, Jr. |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 | 9/2012 | LaFrance |
| 8,301,365 B2 | 10/2012 | Niwa et al. |
| 8,319,605 B2 | 11/2012 | Hassan et al. |
| 8,326,259 B2 | 12/2012 | Gautama et al. |
| 8,354,768 B2 | 1/2013 | Cipriani |
| 8,355,965 B2 | 1/2013 | Yamada |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,564,241 B2 | 10/2013 | Masuda |
| 8,614,565 B2 | 12/2013 | Lubawy |
| 8,725,135 B2 | 5/2014 | Weyl et al. |
| 2001/0018903 A1 | 9/2001 | Hirose et al. |
| 2001/0052433 A1 | 12/2001 | Harris et al. |
| 2002/0023789 A1 | 2/2002 | Morisawa et al. |
| 2002/0070851 A1 | 6/2002 | Raichle et al. |
| 2003/0052796 A1 | 3/2003 | Schmidt et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2005/0247446 A1 | 11/2005 | Gawthrop |
| 2006/0046895 A1 | 3/2006 | Thacher et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0126395 A1 | 6/2007 | Suchar |
| 2007/0145945 A1 | 6/2007 | McGinley et al. |
| 2007/0159297 A1 | 7/2007 | Paulk et al. |
| 2007/0175429 A1 | 8/2007 | Yanagida et al. |
| 2007/0208468 A1 | 9/2007 | Sankaran et al. |
| 2007/0238164 A1 | 10/2007 | Kim |
| 2008/0143292 A1 | 6/2008 | Ward |
| 2008/0154801 A1 | 6/2008 | Fein et al. |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0045773 A1 | 2/2009 | Pandya et al. |
| 2009/0082957 A1* | 3/2009 | Agassi ............ B60L 3/12 701/532 |
| 2009/0112394 A1 | 4/2009 | Lepejian et al. |
| 2009/0158790 A1 | 6/2009 | Oliver |
| 2009/0198372 A1 | 8/2009 | Hammerslag |
| 2009/0240575 A1 | 9/2009 | Bettez et al. |
| 2009/0251300 A1 | 10/2009 | Yasuda et al. |
| 2009/0261779 A1 | 10/2009 | Zyren |
| 2009/0273235 A1 | 11/2009 | Ichikawa |
| 2009/0294188 A1 | 12/2009 | Cole |
| 2010/0013433 A1 | 1/2010 | Baxter et al. |
| 2010/0026238 A1 | 2/2010 | Suzuki et al. |
| 2010/0051363 A1 | 3/2010 | Inoue et al. |
| 2010/0052588 A1* | 3/2010 | Okamura ............ B60L 15/2045 318/434 |
| 2010/0089547 A1* | 4/2010 | King ............ B60L 3/0046 165/42 |
| 2010/0094496 A1* | 4/2010 | Hershkovitz ............ B60L 3/12 701/22 |
| 2010/0114798 A1 | 5/2010 | Sirton |
| 2010/0114800 A1 | 5/2010 | Yasuda et al. |
| 2010/0134067 A1 | 6/2010 | Baxter et al. |
| 2010/0138098 A1* | 6/2010 | Takahara ............ B60L 11/123 701/31.4 |
| 2010/0145717 A1 | 6/2010 | Hoeltzel |
| 2010/0161481 A1 | 6/2010 | Littrell |
| 2010/0188043 A1 | 7/2010 | Kelty et al. |
| 2010/0191585 A1 | 7/2010 | Smith |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0225266 A1 | 9/2010 | Hartman |
| 2010/0235043 A1 | 9/2010 | Seta et al. |
| 2010/0250043 A1 | 9/2010 | Scheucher |
| 2010/0308989 A1 | 12/2010 | Gasper |
| 2010/0324800 A1 | 12/2010 | Hanft et al. |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0060481 A1 | 3/2011 | Kang et al. |
| 2011/0071932 A1 | 3/2011 | Agassi et al. |
| 2011/0082598 A1 | 4/2011 | Boretto et al. |
| 2011/0082621 A1 | 4/2011 | Berkobin et al. |
| 2011/0106329 A1 | 5/2011 | Donnelly et al. |
| 2011/0112710 A1* | 5/2011 | Meyer-Ebeling et al. ..... 701/22 |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1* | 6/2011 | Crombez ............ B60W 30/182 701/123 |

(56) References Cited

U.S. PATENT DOCUMENTS

| | | |
|---|---|---|
| 2011/0169447 A1 | 7/2011 | Brown et al. |
| 2011/0191265 A1 | 8/2011 | Lowenthal et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224868 A1 | 9/2011 | Collings, III et al. |
| 2011/0224900 A1 | 9/2011 | Hiruta et al. |
| 2011/0241824 A1 | 10/2011 | Uesugi |
| 2011/0248668 A1 | 10/2011 | Davis et al. |
| 2011/0260691 A1* | 10/2011 | Ishibashi ............ B60L 11/1842 320/134 |
| 2011/0270480 A1 | 11/2011 | Ishibashi et al. |
| 2011/0279257 A1 | 11/2011 | Au et al. |
| 2011/0282527 A1 | 11/2011 | Inbarajan et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1* | 6/2012 | Gallagher ............ B60L 11/1861 701/22 |
| 2012/0157083 A1 | 6/2012 | Otterson |
| 2012/0158229 A1* | 6/2012 | Schaefer ............ B60L 11/1842 701/22 |
| 2012/0167071 A1 | 6/2012 | Paek |
| 2012/0173292 A1 | 7/2012 | Solomon et al. |
| 2012/0194346 A1 | 8/2012 | Tsai et al. |
| 2012/0223575 A1 | 9/2012 | Hachiya et al. |
| 2012/0233077 A1 | 9/2012 | Tate, Jr. et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299527 A1 | 11/2012 | Vo |
| 2012/0299537 A1 | 11/2012 | Kikuchi |
| 2012/0299721 A1 | 11/2012 | Jones |
| 2012/0316671 A1 | 12/2012 | Hammerslag et al. |
| 2012/0319649 A1 | 12/2012 | Billmaier |
| 2013/0024306 A1 | 1/2013 | Shah et al. |
| 2013/0026972 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0151049 A1 | 6/2013 | Higashitani et al. |
| 2013/0151293 A1 | 6/2013 | Karner et al. |
| 2013/0166119 A1 | 6/2013 | Kummer et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1 | 10/2013 | Dwan et al. |
| 2013/0345935 A1 | 12/2013 | Chang |
| 2014/0028089 A1 | 1/2014 | Luke et al. |
| 2014/0163813 A1 | 6/2014 | Chen et al. |
| 2014/0368032 A1 | 12/2014 | Doerndorfer |
| 2015/0042157 A1 | 2/2015 | Chen et al. |
| 2015/0046012 A1 | 2/2015 | Chen et al. |

FOREIGN PATENT DOCUMENTS

| | | |
|---|---|---|
| CN | 101071953 A | 11/2007 |
| CN | 102064565 A | 5/2011 |
| CN | 101 950 998 B | 9/2012 |
| DE | 44 32 539 A1 | 6/1995 |
| DE | 10 2007 045633 A1 | 4/2009 |
| DE | 10 2009 016869 A1 | 10/2010 |
| DE | 10 2010 039075 A1 | 2/2011 |
| EP | 0 693 813 A1 | 1/1996 |
| EP | 1 177 955 A2 | 2/2002 |
| EP | 1 667 306 A1 | 6/2006 |
| EP | 1 798 100 A2 | 6/2007 |
| EP | 2 101 390 A2 | 9/2009 |
| EP | 2 182 575 A1 | 5/2010 |
| EP | 2 230 146 A2 | 9/2010 |
| EP | 2 428 939 A1 | 3/2012 |
| JP | 5-38003 A | 2/1993 |
| JP | 5-135804 A | 6/1993 |
| JP | 07-031008 A | 1/1995 |
| JP | 7-36504 U | 7/1995 |
| JP | 8-178683 A | 7/1996 |
| JP | 9-119839 A | 5/1997 |
| JP | 10-117406 A | 5/1998 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11 205914 A * | 7/1999 |
| JP | 11 205914 A1 * | 7/1999 |
| JP | 2000-102102 A | 4/2000 |
| JP | 2000-102103 A | 4/2000 |
| JP | 2000-341868 A | 12/2000 |
| JP | 2001-57711 A | 2/2001 |
| JP | 2001-128301 | 5/2001 |
| JP | 2002-140398 A | 5/2002 |
| JP | 2003-102110 A | 4/2003 |
| JP | 2003-118397 | 4/2003 |
| JP | 2003-262525 A | 9/2003 |
| JP | 2004-215468 A | 7/2004 |
| JP | 2005-67453 A | 3/2005 |
| JP | 2006-121874 A | 5/2006 |
| JP | 2007-35479 A | 2/2007 |
| JP | 2007-60353 A | 3/2007 |
| JP | 2007-118642 A | 5/2007 |
| JP | 2007-148590 A | 6/2007 |
| JP | 2007-325458 A | 12/2007 |
| JP | 2008-127894 A | 6/2008 |
| JP | 2008-219953 A | 9/2008 |
| JP | 2008-285075 A | 11/2008 |
| JP | 2008-301598 A | 12/2008 |
| JP | 2009-8609 A | 1/2009 |
| JP | 2009-512035 A | 3/2009 |
| JP | 2009-103504 A | 5/2009 |
| JP | 2009-171647 A | 7/2009 |
| JP | 2009171646 A | 7/2009 |
| JP | 4319289 B2 | 8/2009 |
| JP | 2009-303364 A | 12/2009 |
| JP | 2010-022148 A | 1/2010 |
| JP | 2010-108833 A | 5/2010 |
| JP | 2010-148246 A | 7/2010 |
| JP | 2010-179764 A | 8/2010 |
| JP | 2010-186238 A | 8/2010 |
| JP | 2010-191636 A | 9/2010 |
| JP | 2010-200405 A | 9/2010 |
| JP | 2010-212048 A | 9/2010 |

(56) References Cited

FOREIGN PATENT DOCUMENTS

| | | |
|---|---|---|
| JP | 2010-269686 A | 12/2010 |
| JP | 2010-540907 A | 12/2010 |
| JP | 2011-83166 A | 4/2011 |
| JP | 2011-102801 A | 5/2011 |
| JP | 2011-126452 | 6/2011 |
| JP | 2011-131631 A | 7/2011 |
| JP | 2011-131805 A | 7/2011 |
| JP | 2011-142704 A | 7/2011 |
| JP | 2011-142779 A | 7/2011 |
| JP | 2011-233470 A | 11/2011 |
| JP | 2012-151916 A | 8/2012 |
| JP | 2012-526409 A | 10/2012 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WF | 2013/142154 A1 | 9/2013 |
| WO | 98/21132 A1 | 5/1998 |
| WO | 99/03186 A1 | 1/1999 |
| WO | 2009/039454 A1 | 3/2009 |
| WO | 2010/005052 A2 | 1/2010 |
| WO | 2010/033517 A2 | 3/2010 |
| WO | 2010/033881 A1 | 3/2010 |
| WO | 2010/035605 A1 | 4/2010 |
| WO | 2010/115573 A1 | 10/2010 |
| WO | WO 2010115573 A1 * 10/2010 .......... B60L 11/1842 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/144951 A1 | 10/2013 |

OTHER PUBLICATIONS

Chen et al., "Apparatus, Method and Article for Providing Vehicle Diagnostic Data," U.S. Appl. No. 61/601,404, filed Feb. 21, 2012, 56 pages.

Chen et al., "Apparatus, Method and Article for Providing Vehicle Diagnostic Data," U.S. Appl. No. 13/559,390, filed Jul. 26, 2012, 61 pages.

International Search Report and Written Opinion for corresponding European Patent Application No. PCT/US2012/048349, mailed Feb. 18, 2013, 9 pages.

International Search Report and Written Opinion for corresponding European Patent Application No. PCT/US2012/048354, mailed Feb. 18, 2013, 11 pages.

International Search Report and Written Opinion for corresponding European Patent Application No. PCT/US2012/048358, mailed Feb. 25, 2013, 9 pages.

International Search Report and Written Opinion for corresponding European Patent Application No. PCT/US2012/048366, mailed Jan. 21, 2013, 10 pages.

International Search Report and Written Opinion for corresponding European Patent Application No. PCT/US2012/048367, mailed Jan. 17, 2013, 8 pages.

International Search Report and Written Opinion for corresponding European Patent Application No. PCT/US2012/048375, mailed Jan. 23, 2013, 9 pages.

International Search Report and Written Opinion for corresponding European Patent Application No. PCT/US2012/048379, mailed Dec. 17, 2012, 9 pages.

International Search Report and Written Opinion for corresponding International Application No. PCT/US2012/048391, mailed Dec. 21, 2012, 9 pages.

International Search Report and Written Opinion for corresponding International Patent Application No. PCT/US2012/048380, mailed Feb. 27, 2013, 9 pages.

International Search Report and Written Opinion for corresponding International Patent Application No. PCT/US2012/048382, mailed Feb. 27, 2013, 9 pages.

International Search Report and Written Opinion for corresponding European Patent Application No. PCT/US2012/063979, mailed Mar. 4, 2013, 10 pages.

Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.

Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.

Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.

Luke et al., "Detectible Indication of an Electric Motor Vehicle Standby Mode," U.S. Appl. No. 61/543,720, filed Oct. 5, 2011, 35 pages.

Luke et al., "Detectible Indication of an Electric Motor Vehicle Standby Mode," U.S. Appl. No. 61/684,432, filed Aug. 17, 2012, 41 pages.

Luke et al., "Modular System for Collection and Distribution of Electric Storage Devices," U.S. Appl. No. 61/789,065, filed Mar. 15, 2013, 76 pages.

Luke et al., "Apparatus, Method and Article for Authentication, Security and Control of Power Storage Devices, Such as Batteries," U.S. Appl. No. 61/534,761, filed Sep. 14, 2011, 55 pages.

Luke et al., "Apparatus, Method and Article for Authentication, Security and Control of Power Storage Devices, Such as Batteries," U.S. Appl. No. 13/559,038, filed Jul. 26, 2012, 59 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Authentication, Security and Control of Power Storage Devices, Such as Batteries, Based on User Profiles," U.S. Appl. No. 13/559,010, filed Jul. 26, 2012, 58 pages.

Luke et al., "Apparatus, Method and Article for Collection, Charging and Distributing Power Storage Devices, Such as Batteries," U.S. Appl. No. 61/511,900, filed Jul. 26, 2011, 73 pages.

Luke et al., "Apparatus, Method and Article for Collection, Charging and Distributing Power Storage Devices, Such as Batteries," U.S. Appl. No. 61/647,936, filed May 16, 2012, 76 pages.

Luke et al., "Apparatus, Method and Article for Collection, Charging and Distributing Power Storage Devices, Such as Batteries," U.S. Appl. No. 13/559,314, filed Jul. 26, 2012, 81 pages.

Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.

(56) References Cited

OTHER PUBLICATIONS

Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Apparatus, Method and Article for Reserving Power Storage Devices at Reserving Power Storage Device Collection, Charging and Distribution Machines," U.S. Appl. No. 13/559,064, filed Jul. 26, 2012, 72 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," U.S. Appl. No. 61/511,880, filed Jul. 26, 2011, 52 pages.
Luke et al., "Electric Device Drive Assembly and Cooling System for Electric Device Drive," U.S. Appl. No. 13/650,395, filed Oct. 12, 2012, 62 pages.
Luke et al., "Electric Devices," U.S. Appl. No. 13/650,498, filed Oct. 12, 2012, 26 pages.
Luke et al., "Improved Drive Assembly for Electric Device," U.S. Appl. No. 13/650,392, filed Oct. 12, 2012, 43 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 13/559,259, filed Jul. 26, 2012, 51 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," U.S. Appl. No. 13/559,054, filed Jul. 26, 2012, 64 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for a Power Storage Device Compartment," U.S. Appl. No. 13/559,125, filed Jul. 26, 2012, 65 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Information Regarding Availability of Power Storage Devices at a Power Storage Device Collection, Charging and Distribution Machine," U.S. Appl. No. 13/559,343, filed Jul. 26, 2012, 56 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Providing Locations of Power Storage Device Collection, Charging and Distribution Machines," U.S. Appl. No. 13/559,333, filed Jul. 26, 2012, 60 pages.
Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.
Wu et al., "Apparatus, Method and Article for Security of Vehicles," U.S. Appl. No. 61/557,176, filed Nov. 8, 2011, 37 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, System, and Method for Authentication of Vehicular Components ," U.S. Appl. No. 61/783,041, filed Mar. 14, 2013, 84 pages.
Chen et al., "Apparatus, System, and Method for Authentication of Vehicular Components," Office Action mailed Nov. 22, 2013, for U.S. Appl. No. 13/918,703, 35 pages.
Chen et al., "Apparatus, System, and Method for Authentication of Vehicular Components," Notice of Allowance mailed Mar. 25, 2014, for U.S. Appl. No. 13/918,703, 7 pages.
Chen et al., "Apparatus, Method and Article for Providing Vehicle Diagnostic Data," Office Action mailed Dec. 30, 2013, for U.S. Appl. No. 14/022,134, 20 pages.
Chen et al., "Apparatus, Method and Article for Providing Vehicle Diagnostic Data," U.S. Appl. No. 14/022,134, filed Sep. 9, 2013, 61 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 14/079,894, filed Nov. 14, 2013, 41 pages.
Huang et al., "Apparatus, Method and Article for Vehicle Turn Signals," U.S. Appl. No. 61/727,403, filed Nov. 16, 2012, 41 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.

(56) References Cited

OTHER PUBLICATIONS

International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Patent Application No. PCT/US2012/048344, mailed Feb. 28, 2013, 9 pages.
International Search Report and Written Opinion for corresponding International Patent Application No. PCT/US2012/048347, mailed Dec. 18, 2012, 8 pages.
International Search Report and Written Opinion for corresponding International Application No. PCT/US2012/058930, mailed Mar. 15, 2013, 11 pages.
International Search Report and Written Opinion for corresponding International Application No. PCT/US2013/070131, mailed Feb. 19, 2014, 17 pages.
International Search Report and Written Opinion for corresponding International Application No. PCT/US2012/059931, mailed Mar. 29, 2013, 13 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.
Luke et al., "Detectible Indication of an Electric Motor Vehicle Standby Mode," Office Action for U.S. Appl. No. 13/646,320, mailed May 30, 2013, 13 pages.
Luke et al., "Drive Assembly for Electric Powered Device," U.S. Appl. No. 61/546,411, filed Oct. 12, 2011, 18 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.
Luke et al., "Thermal Management of Components in Electric Motor Drive Vehicles," Office Action mailed Apr. 2, 2014, for U.S. Appl. No. 13/559,259, 11 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Microchip, "AN885: Brushless DC (BLDC) Motor Fundamentals," Microchip Technology Inc., 2003, 19 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, mailed Feb. 24, 2014, 28 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.
Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
Wu, "Battery Configuration for an Electric Vehicle," U.S. Appl. No. 14/057,405, filed Oct. 18, 2013, 38 pages.
Wu, "Apparatus, Method and Article for Power Storage Device Failure Safety," U.S. Appl. No. 14/071,134, filed Nov. 4, 2013, 68 pages.
Wu, "Apparatus, Method and Article for Power Storage Device Failure Safety," Office Action for U.S. Appl. No. 14/071,134, mailed Feb. 12, 2014, 14 pages.
Chen et al., "Apparatus, Method and Article for Providing Vehicle Diagnostic Data," Office Action mailed Apr. 9, 2014, for U.S. Appl. No. 14/022,134, 20 pages.
Chen et al., "Apparatus, Method and Article for Providing Vehicle Diagnostic Data," Notice of Allowance mailed Jul. 9, 2014, for U.S. Appl. No. 14/022,134, 10 pages.
Chen et al., "Apparatus, Method and Article for Providing Vehicle Diagnostic Data," Office Action mailed Jun. 18, 2014, for U.S. Appl. No. 13/559,390, 16 pages.
Chen et al., "Apparatus, Method and Article for Providing Vehicle Diagnostic Data," Notice of Allowance mailed Nov. 3, 2014, for U.S. Appl. No. 13/559,390, 10 pages.
Chen et al., "Apparatus, Method and Article for Providing Vehicle Diagnostic Data," U.S. Appl. No. 14/609,201, filed Jan. 29, 2015, 61 pages.
Chen et al., "Systems and Methods for Powering Electric Vehicles Using a Single or Multiple Power Cells," U.S. Appl. No. 61/862,852, filed Aug. 6, 2013, 46 pages.
International Search Report and Written Opinion for corresponding International Application No. PCT/US2013/065704, mailed Feb. 13, 2014, 13 pages.
International Search Report and Written Opinion, for corresponding International Application No. PCT/US2014/021369, mailed Jul. 2, 2014, 14 pages.
International Search Report and Written Opinion for corresponding International Application No. PCT/US2014/024757, mailed Jul. 11, 2014, 15 pages.
International Search Report and Written Opinion, for corresponding International Application No. PCT/US2014/022610, mailed Jul. 10, 2014, 12 pages.
International Search Report and Written Opinion for corresponding International Application No. PCT/US2014/023539, mailed Sep. 4, 2014, 12 pages.
International Search Report and Written Opinion mailed Nov. 18, 2014, for corresponding International Application No. PCT/US2014/050000, 11 pages.

(56) References Cited

OTHER PUBLICATIONS

International Search Report and Written Opinion for corresponding International Application No. PCT/US2014/050001, mailed Nov. 18, 2014, 9 pages.
International Search Report and Written Opinion mailed Feb. 16, 2015, for corresponding International Application No. PCT/US2014/063931, 14 pages.
Japanese Office Action with English Translation dated Mar. 31, 2015, for corresponding JP Application No. 2014-523014, 9 pages.
Japanese Office Action with English Translation, mailed Dec. 16, 2014, for corresponding JP Application No. 2014-523013, 11 pages.
English Translation of Japanese Office Action mailed Feb. 17, 2015, for corresponding Japanese Patent Application No. 2014-523007, 7 pages.
Luke et al., "Apparatus, Method and Article for Authentication, Security and Control of Portable Charging Devices and Power Storage Devices, Such as Batteries," Office Action mailed Jun. 26, 2014, for U.S. Appl. No. 14/017,090, 19 pages.
Luke et al., "Apparatus, Method and Article for Redistributing Power Storage Devices, Such as Batteries, Between Collection, Charging and Distribution Machines," Office Action mailed Mar. 13, 2015, for U.S. Appl. No. 13/559,091, 33 pages.
Luke et al., "Detectible Indication of an Electric Motor Vehicle Standby Mode," Notice of Allowance for U.S. Appl. No. 13/646,320, mailed Apr. 10, 2014, 8 pages.
Luke et al., "Apparatus, Method and Article for Authentication, Security and Control of Power Storage Devices, Such as Batteries," Office Action mailed Aug. 19, 2014, for U.S. Appl. No. 13/559,038, 14 pages.
Luke et al., "Apparatus, Method and Article for Authentication, Security and Control of Power Storage Devices, Such as Batteries," Office Action mailed Aug. 21, 2014, for U.S. Appl. No. 14/023,344, 13 pages.
Luke et al., "Thermal Management of Components in Electric Motor Drive Vehicles," Notice of Allowance mailed Jul. 28, 2014, for U.S. Appl. No. 13/559,259, 7 pages.
Luke, "Apparatus, Method and Article for Providing Information Regarding a Vehicle Via a Mobile Device," Office Action for U.S. Appl. No. 14/017,081, mailed Jul. 21, 2014, 42 pages.
Luke, "Apparatus, Method and Article for Providing Information Regarding a Vehicle Via a Mobile Device," Office Action for U.S. Appl. No. 14/017,081, mailed Dec. 31, 2014, 59 pages.
Park, "A Comprehensive Thermal Management System Model for Hybrid Electric Vehicles," dissertation, The University of Michigan, 2011, 142 pages.
Taylor et al., "Apparatus, Method and Article for Physical Security of Power Storage Devices in Vehicles," Office Action mailed Dec. 10, 2014, for U.S. Appl. No. 14/012,845, 13 pages.
Taylor et al., "Apparatus, Method and Article for Providing Vehicle Event Data," U.S. Appl. No. 61/901,660, filed Nov. 8, 2013, 58 pages.
Taylor et al., "Systems and Methods for Utilizing an Array of Power Storage Devices, Such as Batteries," U.S. Appl. No. 14/601,840, filed Jan. 21, 2015, 51 pages.
Wu et al., "Apparatus, Method and Article for Security of Vehicles," Office Action mailed Oct. 2, 2014, for U.S. Appl. No. 13/671,144, 20 pages.
Wu et al., "Apparatus, Method and Article for a Power Storage Device Compartment," Office Action for U.S. Appl. No. 13/559,125, mailed Sep. 9, 2014, 28 pages.
Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance mailed Jun. 30, 2014, for U.S. Appl. No. 14/022,140, 5 pages.
Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, filed Oct. 9, 2014, 56 pages.
Wu et al., "Apparatus, Method and Article for Providing Locations of Power Storage Device Collection, Charging and Distribution Machines," Notice of Allowance mailed Jul. 10, 2014, for U.S. Appl. No. 13/559,333, 9 pages.
Wu et al., "Apparatus, Method and Article for Providing Locations of Power Storage Device Collection, Charging and Distribution Machines," Office Action mailed Aug. 6, 2014, for U.S. Appl. No. 14/022,147, 17 pages.
Wu et al., "Apparatus, Method and Article for Providing Locations of Power Storage Device Collection, Charging and Distribution Machines," Notice of Allowance mailed Nov. 25, 2014, for U.S. Appl. No. 14/022,147, 5 pages.
Wu et al., "Apparatus, Method and Article for Power Storage Device Failure Safety," Office Action mailed Jun. 9, 2014, for U.S. Appl. No. 14/071,134, 15 pages.
Wu et al., "Apparatus, Method and Article for Power Storage Device Failure Safety," Notice of Allowance mailed Apr. 13, 2015, for U.S. Appl. No. 14/071,134, 10 pages.
Chen et al., "Apparatus, Method and Article for Providing Vehicle Diagnostic Data," Office Action mailed Jun. 3, 2015, for U.S. Appl. No. 14/179,442, 20 pages.
Chen et al., "Apparatus, Method and Article for Providing Vehicle Diagnostic Data," Notice of Allowance mailed Jun. 23, 2015, for U.S. Appl. No. 14/609,201, 12 pages.
Communication pursuant to Rules 70(2) and 70a(2) EPC, for corresponding European Patent Application No. 12817141.0, dated Aug. 20, 2015, 1 page.
Communication pursuant to Rules 70(2) and 70a(2) EPC, for corresponding European Patent Application No. 12817696.3, dated Aug. 21, 2015, 1 page.
Communication pursuant to Rules 70(2) and 70a(2) EPC, for corresponding European Patent Application No. 12818447.0, dated Aug. 21, 2015, 1 page.
Extended European Search Report dated Aug. 5, 2015, for corresponding European Patent Application No. 12817392.9, 9 pages.
Extended European Search Report dated Apr. 24, 2015, for corresponding European Patent Application No. 12817097.4, 9 pages.
Extended European Search Report dated Aug. 3, 2015, for corresponding European Patent Application No. 12817141.0, 9 pages.
Extended European Search Report dated Aug. 5, 2015, for Corresponding European Patent Application No. 12818447.0, 17 pages.
Extended European Search Report dated Aug. 5, 2015, for Corresponding European Patent Application No. 12817696.3, 13 pages.
Huang et al., "Apparatus, Method and Article for Vehicle Turn Signals," Office Action mailed May 14, 2015, for U.S. Appl. No. 14/079,894, 9 pages.
International Preliminary Report on Patentability and Written Opinion for corresponding International Patent Application No. PCT/US2013/070131, issued on May 19, 2015, 13 pages.
Japanese Office Action with English Translation dated Jul. 7, 2015 for corresponding Japanese application No. 2014-523007, 3 pages.
Japanese Office Action with English Translation dated Jun. 30, 2015, for corresponding Japanese Application No. 2014-523020, 15 pages.
Luke et al., "Apparatus, Method and Article for Authentication, Security and Control of Power Storage Devices, Such as Batteries," Notice of Allowance mailed Aug. 3, 2015, for U.S. Appl. No. 13/559,038, 13 pages.
Luke et al., "Apparatus, Method and Article for Authentication, Security and Control of Power Storage Devices, Such as Batteries," Office Action mailed Jun. 19, 2015, for U.S. Appl. No. 14/023,344, 9 pages.
Luke et al., "Apparatus, Method and Article for Authentication, Security and Control of Power Storage Devices, Such as Batteries, Based on User Profiles," Office Action mailed May 11, 2015, for U.S. Appl. No. 13/559,010, 26 pages.

(56) References Cited

OTHER PUBLICATIONS

Luke et al., "Apparatus, Method and Article for Collection, Charging and Distributing Power Storage Devices, Such as Batteries," Notice of Allowance mailed Jun. 8, 2015, for U.S. Appl. No. 13/559,314, 12 pages.

Luke et al., "Apparatus, Method and Article for Reserving Power Storage Devices at Reserving Power Storage Device Collection, Charging and Distribution Machines," Office Action mailed Jun. 23, 2015, for U.S. Appl. No. 13/559,064, 32 pages.

Luke, "Apparatus, Method and Article for Providing Information Regarding a Vehicle Via a Mobile Device," Office Action mailed Jul. 15, 2015, for U.S. Appl. No. 14/017,081, 61 pages.

Taylor et al., "Apparatus, Method and Article for Physical Security of Power Storage Devices in Vehicles," Office Action mailed Jun. 23, 2015, for U.S. Appl. No. 14/012,845, 11 pages.

Wu et al., "Apparatus, Method and Article for a Power Storage Device Compartment," Office Action for U.S. Appl. No. 13/559,125, mailed Jun. 16, 2015, 30 pages.

Wu et al., "Apparatus, Method and Article for Security of Vehicles," Office Action mailed Jun. 4, 2015, for U.S. Appl. No. 13/674,144, 20 pages.

Chinese Office Action dated Jul. 17, 2015, for corresponding CN Application No. 201280047017.1, 15 pages.

Chinese Office Action dated Jul. 30, 2015, for corresponding CN Application No. 201280046871.6, 25 pages.

Extended European Search Report dated Aug. 27, 2015, for corresponding EP Application No. 12816881.2-1657, 8 pages.

International Preliminary Report on Patentability dated Sep. 8, 2015, for corresponding International Application No. PCT/US2014/021369, 9 pages.

Japanese Office Action dated Sep. 1, 2015, for corresponding JP Application No. 2014-523005, with English Translation, 11 pages.

Japanese Office Action dated Sep. 8, 2015, for corresponding JP Application No. 2014-523018, with English Translation, 12 pages.

Supplementary European Search Report dated Jul. 10, 2015, for corresponding EP Application No. 12847969.8-1503, 5 pages.

\* cited by examiner

DYNAMICALLY LIMITING VEHICLE OPERATION FOR BEST EFFORT ECONOMY

CROSS REFERENCE TO RELATED APPLICATIONS

This application claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

1. Technical Field

The present disclosure generally relates to vehicles which employ electric motors as the prime mover or traction motor and, in particular, thermal management of rechargeable electrical energy storage devices (e.g., secondary batteries, super- or ultracapacitors) and/or other components (e.g., power converters, control circuits) employed in such vehicles.

2. Description of the Related Art

Hybrid and all electrical vehicles are becoming increasing common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped as a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

Zero tail pipe emission alternatives to combustion engines would greatly benefit the air quality, and hence health of large populations.

While the zero tail pipe emissions benefit of all-electric vehicles are appreciated, adoption of all-electric vehicles by large populations has been slow. One of the reasons appears to be related to the somewhat limited range of the main electrical power or energy storage device, typically an array of secondary (i.e., rechargeable) chemical battery cells, commonly referred to as a battery. Performance of the main electrical power storage device may be adversely affected by a variety of conditions, such as current level of charge, temperature and history of use, including age and number of recharging cycles to which the main electrical power storage device has been subjected. Range may also vary based on a variety of other factors or conditions. For example, vehicle related conditions may affect range, for instance size, weight, torque, top speed, drag coefficient. Also for example, driver or operator conditions may affect range, for instance whether and how often the driver or operator drives at high speeds, or accelerates quickly (i.e., jack rabbit starts). As a further example, environmental conditions may affect range, for instance ambient temperatures, and terrain (e.g., flat, hilly).

Ensuring adequate and predictable range is important to achieving wide acceptance of electrically powered vehicles. This may be particularly true where replacement or replenishment of the main electrical power or energy storage device is possible, assuming the vehicle can reach a location of where such replacement or replenishment is available.

The approaches described herein may address some of the issues which have limited adoption of zero tailpipe emission technology, particularly in densely crowded cities, and in populations with limited financial resources.

For example, some of the approaches described herein may limit vehicle operation (e.g., speed, acceleration) and/or operation of electrically powered vehicle accessories (e.g., electrically powered accessories such as air conditioning, heating, defrosting, lighting, audio systems, power windows, power locks, seat heaters, global positioning systems, wireless communication systems, and the like) based on various conditions such as a current charge condition or status of an electrical power or energy storage device (e.g., batteries, super- or ultracapacitors), history of such, conditions related to the vehicle (e.g., mileage, weight, size, drag coefficient), conditions related to a driver or operator of the vehicle (e.g., history with respect to speed, acceleration, mileage) and/or environmental conditions (e.g., ambient temperature, terrain). For example, a controller may control operation of one or more power converters to limit current and/or voltage supplied to a traction electric motor of the vehicle or vehicle accessories, as needed to ensure adequate range to reach a site of replacement or replenishment.

A method of operating a vehicle having a prime mover powered by a main electrical power storage device may be summarized as including determining an estimated range of the vehicle based at least in part on at least one electrical characteristic of the main electrical power storage device at a present time; determining at least an estimate of at least one travel distance between a present location and at least one destination; comparing the determined travel distance with the determined estimated range; and determining whether to limit an operational characteristic of the prime mover of the vehicle based at least in part on a result of the comparison of the determined travel distance and the determined estimated range.

The method may further include limiting at least one operational characteristic of the prime mover of the vehicle in response to the determination. Limiting at least one operational characteristic of the prime mover of the vehicle in response to the determination may include limiting a speed of the vehicle. Limiting at least one operational characteristic of the prime mover of the vehicle in response to the determination may include limiting an acceleration of the vehicle.

Where the prime mover is an electric motor the method may further include limiting a voltage supplied to the electric motor of the vehicle in response to determining that the determined travel distance is more than the determined estimated range.

Where the prime mover is an electric motor the method may further include limiting a current supplied to the electric motor of the vehicle in response to determining that the determined travel distance is more than the determined estimated range.

The method may further include adjusting a temperature of the main electrical power storage device in response to determining that the determined travel distance is more than the determined estimated range. The method may further include ceasing a supply of power to at least one non-essential component of the vehicle in response to determining that the determined travel distance is more than the determined estimated range.

A method of operating a vehicle having a prime mover powered by a main electrical power storage device may be summarized as including determining an estimated range of the vehicle based at least in part on at least one electrical characteristic of the main electrical power storage device at a present time; determining at least an estimate of at least one travel distance between a present location and at least one destination; comparing the determined travel distance with the determined estimated range; and determining whether to limit an operational characteristic of electrically powered vehicle accessories based at least in part on a result of the comparison of the determined travel distance and the determined estimated range.

Determining an estimated range of the vehicle based at least in part on at least one electrical characteristic of the main electrical power storage device at a present time may include determining the estimated range of the vehicle based at least in part on a charge level of the main electrical power storage device at the present time. Determining an estimated range of the vehicle based at least in part on at least one electrical characteristic of the main electrical power storage device at a present time may include determining the estimated range of the vehicle based at least in part on a historical profile for the main electrical power storage device. Determining an estimated range of the vehicle based at least in part on at least one electrical characteristic of the main electrical power storage device at a present time may include determining the estimated range of the vehicle based at least in part on at least one characteristic of the vehicle (size, wt, drag). Determining an estimated range of the vehicle based at least in part on at least one electrical characteristic of the main electrical power storage device at a present time may include determining the estimated range of the vehicle based at least in part on a historical driving pattern of the vehicle. Determining an estimated range of the vehicle based at least in part on at least one electrical characteristic of the main electrical power storage device at a present time may include determining the estimated range of the vehicle based at least in part on a historical driving pattern (speed, acceleration) of a driver of the vehicle at the present time. Determining an estimated range of the vehicle based at least in part on at least one electrical characteristic of the main electrical power storage device at a present time may include determining the estimated range of the vehicle based at least in part on a least one environmental parameter (ambient temperature, terrain) of an environment in which the vehicle is operated at the present time. Determining at least an estimate of at least one travel distance between a present location and at least one destination may include determining a travel distance between the present location and at least one location having a replacement for the main electrical power storage device. Determining at least an estimate of at least one travel distance between a present location and at least one destination may include determining a shortest distance between the present location and the at least one destination on roads along which the vehicle may travel. Comparing the determined travel distance with the determined estimated range may include determining whether the estimated range is within a defined threshold of the determined travel distance. Determining whether to limit an operational characteristic of the prime mover of the vehicle based at least in part on a result of the comparison of the determined travel distance and the determined estimated range may include limiting at least one of a speed or an acceleration of the vehicle in response to the estimated range being within the defined threshold of the determined travel distance. Determining at least an estimate of at least one travel distance between a present location and at least one destination may include accounting for at least one elevational change between the present location and the at least one destination.

A vehicle may be summarized as including a prime mover coupled to drive at least one wheel of the vehicle; a main electrical power storage device that stores power; a power supply coupled and operable to selectively transfer electrical power between the main electrical power storage device and the prime mover; and a controller communicatively coupled to control the power supply, wherein the controller limits at least one operational characteristic of the prime mover of the vehicle in response to a result of a comparison of a determined estimated range of the vehicle at a present time and a determined travel distance between a present location of the vehicle and at least one destination.

The controller may further determine the estimated range of the vehicle based at least in part on at least one electrical characteristic of the main electrical power storage device at the present time; determines the travel distance between a present location and at least one destination; compare the determined travel distance with the determined estimated range; and determine whether to limit the operational characteristic of the prime mover of the vehicle based at least in part on the result of the comparison of the determined travel distance and the determined estimated range. The prime mover may be an electric motor and the controller may apply control signals to the power supply that limit a voltage supplied to the electric motor of the vehicle in response to the determination. The prime mover may be an electric motor and the controller may apply control signals to the power supply that limit a current supplied to the electric motor of the vehicle in response to the determination. The controller may cease a supply of power to at least one non-essential component of the vehicle in response to the determination.

The controller may determine the estimated range of the vehicle based at least in part on a charge level of the main electrical power storage device at the present time. The controller may determine the estimated range of the vehicle based at least in part on a historical profile for the main electrical power storage device. The controller may determine the estimated range of the vehicle based at least in part on at least one characteristic of the vehicle. The controller may determine the estimated range of the vehicle based at least in part on a historical driving pattern of the vehicle. The controller may determine the estimated range of the vehicle based at least in part on a historical driving pattern of a driver of the vehicle at the present time. The controller may determine the estimated range of the vehicle based at least in part on a least one environmental parameter of an environment in which the vehicle is operated at the present time. The controller may determine the estimated range of the vehicle based at least in part on at least one elevational change between the present location and the at least one destination. The controller may determine the travel distance between the present location and at least one location having a replacement for the main electrical power storage device. The controller may determine a shortest distance between the present location and the at least one destination along roads along which the vehicle may travel. The controller may determine whether the estimated range is within a defined threshold of the determined travel distance. The controller may limit at least one of a speed or an acceleration of the vehicle in response to the estimated range being within a defined threshold of the determined travel distance.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, super- or ultracapacitors. Reference to batteries means a chemical storage cell or cells, for instance rechargeable or secondary battery cells including, but not limited to, nickel cadmium alloy or lithium ion battery cells.

The headings and Abstract of the Disclosure provided herein are for convenience only and do not interpret the scope or meaning of the embodiments.

Figure 1:
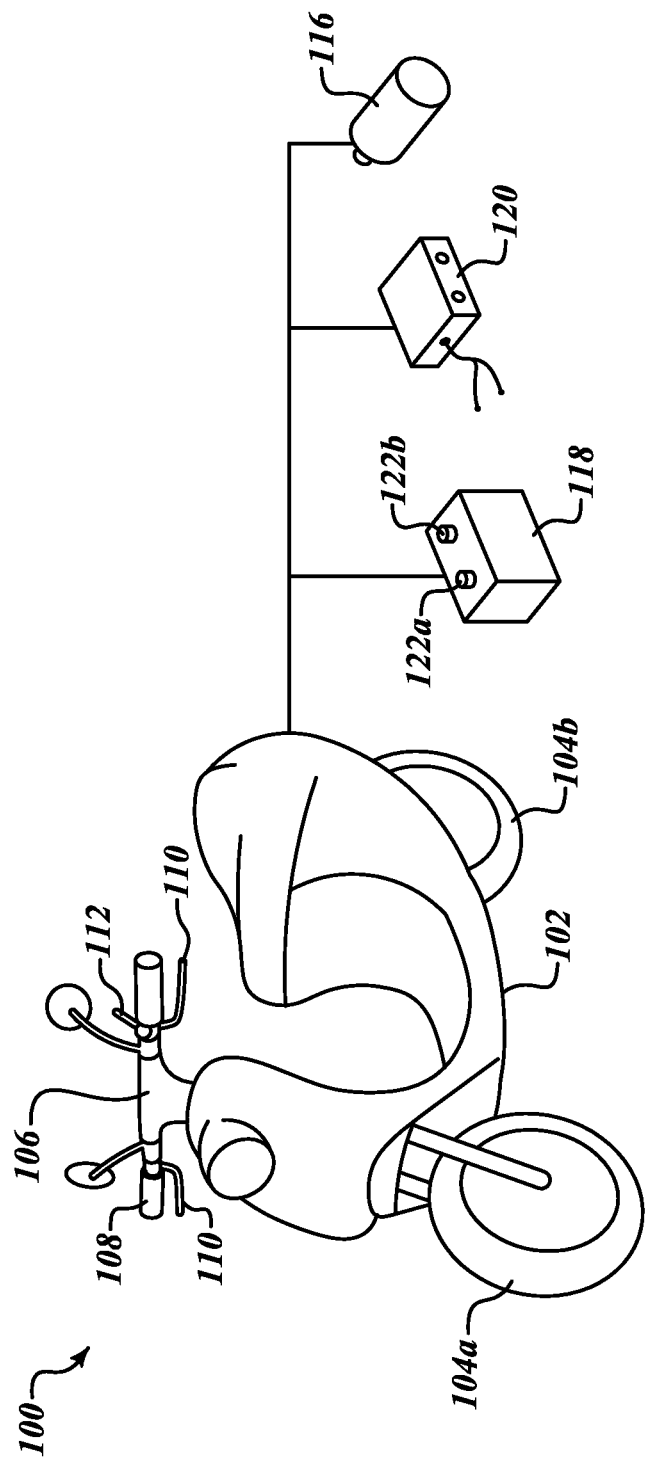
FIG. 1 is an isometric, partially exploded, view of an electric scooter or motorbike which may include the various components or structures described herein, according to one non-limiting illustrated embodiment.

FIG. 1 shows an electrically powered personnel transportation vehicle in the form of an electric scooter or motorbike 100, according to one illustrated embodiment.

As previously noted, combustion engine scooters and motorbikes are common in many large cities, for example in Asia, Europe and the Middle East. The ability to address performance or efficiency issues related to the use of electrical power storage devices (e.g., secondary batteries) as the main or primary source of power for a vehicle may foster the use of all-electric scooters and motorbikes 100 in place of internal combustion engine scooters and motorbikes, thereby alleviating air pollution, as well as reducing noise.

The electric scooter or motorbike 100 includes a frame 102, wheels 104a, 104b (collectively 104), and handle bar 106 with user controls such as throttle 108, brake levers 110, turn indicators switches 112, etc., all of which may be of conventional design. The electric scooter or motorbike 100 may also include a power system which includes a traction electric motor 116 coupled to drive at least one of the wheels 104b, at least one main electrical power storage device 118 that stores electrical power to power at least the traction electric motor 116, and control circuit 120 which controls power distribution between at least the main electrical power storage device 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as operating in a regenerative braking mode. In the drive mode, the traction electric motor consumes electrical power, to drive the wheel. In the regenerative braking mode, the traction electric motor operates as a generator, producing electric current in response to rotation of the wheel and producing a braking effect to slow a vehicle.

The main electrical energy storage devices 118 may take a variety of forms, for example batteries (e.g., array of battery cells) or super- or ultracapacitors (e.g., array of ultracapacitor cells). For example, the electrical energy storage devices 118 may take the form of rechargeable batteries (i.e., secondary cells or batteries). The electrical energy storage devices 118 may, for instance, be sized to physically fit, and electrically power, personal transportation vehicles, such as all-electric scooters or motorbikes 100, and may be portable to allow easy replacement or exchange. Given the likely demand imposed by the transportation application, main electrical energy storage devices 118 are likely to take the form of one or more chemical battery cells.

The electrical energy storage devices 118 may include a number of electrical terminals 122a, 122b (two illustrated, collectively 122), accessible from an exterior of the electrical energy storage device 118. The electrical terminals 122 allow charge to be delivered from the electrical energy storage device 118, as well as allow charge to be delivered to the electrical energy storage device 118 for charging or recharging the same. While illustrated in FIG. 1 as posts, the electrical terminals 122 may take any other form which is accessible from an exterior of the electrical energy storage device 118, including electrical terminals positioned within slots in a battery housing.

As better illustrated and described below, the control circuit 120 includes various components for transforming, conditioning and controlling the transfer of electrical power, particularly between the electrical energy storage device 118 and the traction electric motor 116.

Figure 2:
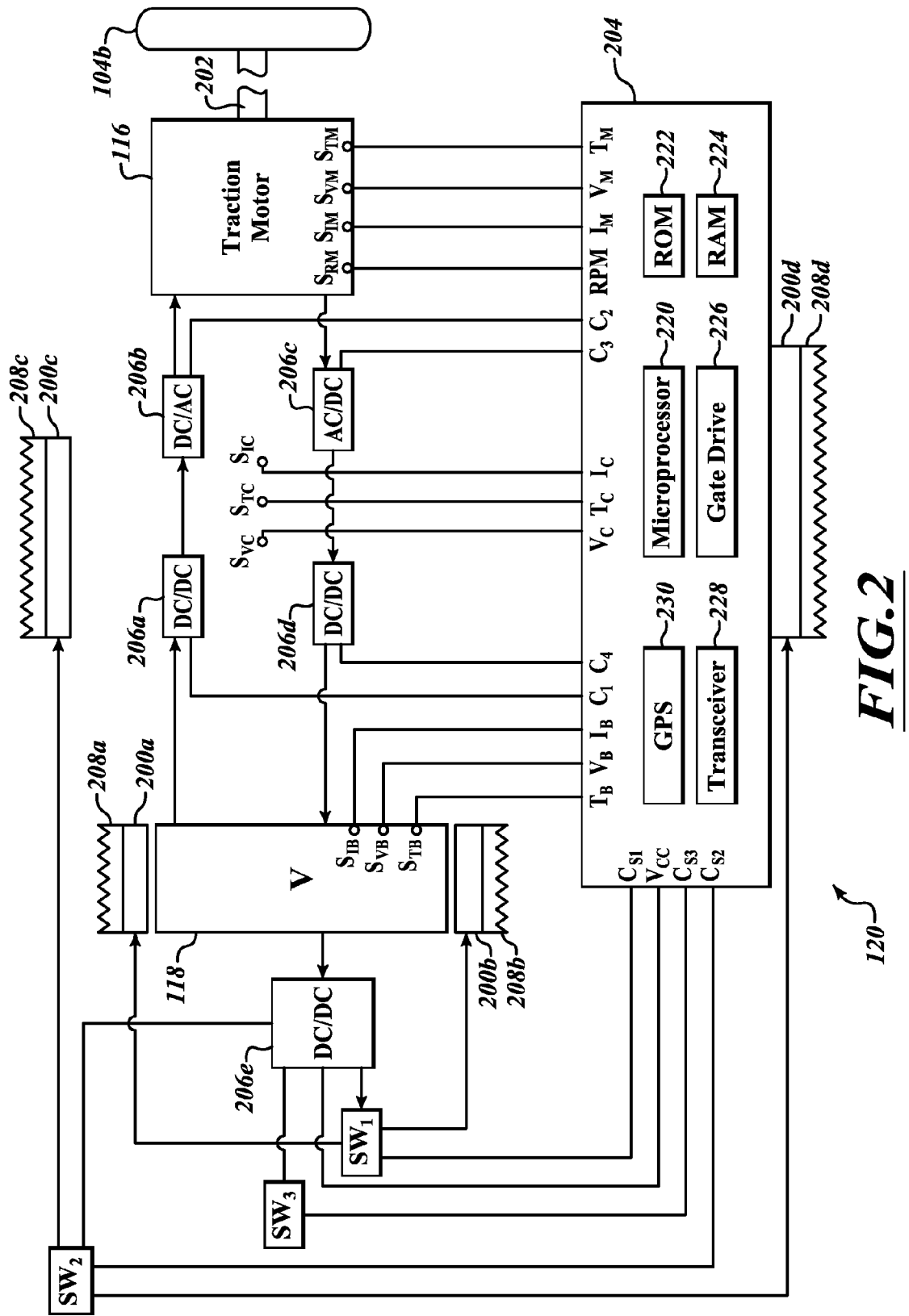
FIG. 2 is a block diagram of some of the components or structures of the scooter or motorbike of FIG. 1, according to one non-limiting illustrated embodiment.

FIG. 2 shows the portions of the electric scooter or motorbike 100, according to one illustrated embodiment. In particular, FIG. 2 shows an embodiment which employs the electrical energy storage device 118 to supply power generated by the traction electric motor 116 to be used for adjusting or controlling temperature of various components (e.g., electrical energy storage device 118 and/or circuitry) via a number of temperature adjustment devices, collectively 200.

As illustrated, the traction electric motor 116 includes a shaft 202, which is coupled either directly or indirectly to drive at least one wheel 104b of the electric scooter or motorbike 100. While not illustrated, a transmission (e.g., chain, gears, universal joint) may be employed.

The control circuit 120 may take any of a large variety of forms, and will typically include a controller 204, one or more power converters 206a-206e (five illustrated), switches $SW_1$-$SW_3$ (three illustrated) and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

As illustrated in FIG. 2, the control circuit 120 may include a first DC/DC power converter 206a that in a drive mode or configuration couples the electrical energy storage device 118 to supply power generated by the traction electric motor 116. The first DC/DC power converter 206a may step up a voltage of electrical power from the electrical energy storage device 118 to a level sufficient to drive the traction electric motor 116. The first DC/DC power converter 206a may take a variety of forms, for example an unregulated or a regulated switch mode power converter, which may or may not be isolated. For instance, the first DC/DC power converter 206a may take the form of a regulated boost switch mode power converter, or buck-boost switch mode power converter.

The control circuit 120 may include a DC/AC power converter 206b, commonly referred to as an inverter, that in the drive mode or configuration couples the electrical energy storage device 118 to supply power generated by the traction electric motor 116 via the first DC/DC converter 206a. The DC/AC power converter 206b may invert electrical power from the first DC/DC converter 206a into an AC waveform suitable to drive the traction electric motor 116. The AC wave form may be single phase or multi-phase, for example two or three phase AC power. The DC/AC power converter 206b may take a variety of forms, for example an unregulated or a regulated switch mode power converter, which may or may not be isolated. For instance, the DC/AC power converter 206b may take the form of a regulated inverter.

The first DC/DC power converter 206a and the DC/AC power converter 206b are controlled via control signals $C_1$, $C_2$, respectively, supplied via the controller 204. For example, the controller 204, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 206a, 206b.

As further illustrated in FIG. 2, the control circuit 120 may include an AC/DC power converter 206c, commonly referred to as a rectifier, that in a braking or regenerative braking mode or configuration couples the traction electric motor 116 to supply power generated thereby to the electrical energy storage device 118. The AC/DC power converter 206c may rectify an AC waveform produced by the traction electric motor 116 to a DC form suitable for supplying the electrical energy storage device 118 and optionally other components such as the control circuit 120. The AC/DC power converter 206c may take a variety of forms, for example a full bridge passive diode rectifier or a full bridge active transistor rectifier.

The control circuit 120 may also include a second DC/DC power converter 206d that electrically couples the traction electric motor 116 to the electrical energy storage device 118 via the AC/DC power converter 206c. The second DC/DC power converter 206d may step down a voltage of the electrical power generated by the traction electric motor 116 to a level suitable for the electrical energy storage device 118. The second DC/DC power converter 206d may take a variety of forms, for example an unregulated or regulated switch mode power converter, which may or may not be isolated. For instance, the second DC/DC power converter 206d may take the form of a regulated buck switch mode power converter, synchronous buck switch mode power converter, or buck-boost switch mode power converter.

The AC/DC power converter 206c and the second DC/DC power converter 206d are controlled via control signals $C_3$, $C_4$, respectively, supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206c, 206d.

As further illustrated in FIG. 2, the control circuit 120 may include a third DC/DC power converter 206e that electrically couples the electrical energy storage device 118 to various other components, for example the controller 120. The third DC/DC power converter 206e may step down a voltage of the electrical power supplied by the electrical energy storage device 118 to a level suitable for one or more other components. The third DC/DC power converter 206e may take a variety of forms, for example an unregulated or regulated switch mode power converter, which may or may not be isolated. For instance, the third DC/DC power converter 206e may take the form of a regulated buck switch mode power converter, synchronous buck switch mode power converter, or buck-boost switch mode power converter.

As also illustrated in FIG. 2, the temperature adjustment device(s) 200 may be located to control or adjust temperature of or proximate certain components.

The temperature adjustment device(s) 200 may be located proximate, adjacent to or in contact with one or more other components which would benefit by having active temperature management or handling. For example, a first number of temperature adjustment devices 200a, 200b (two illustrated) may be located proximate, adjacent to or in contact with the main electrical energy storage device 118, which supplies electrical power to the traction electric motor 116. A second number of temperature adjustment devices 200c may be located proximate, adjacent to or in contact with one or more of components or elements of the control circuit, for example one or more of the power converters 206a-206e. A third number of temperature adjustment devices 200d may be located proximate, adjacent to or in contact with one or more components of the controller 204. While illustrated proximate the first DC/DC power converter 206a and DC/AC power converter 206b, the temperature adjustment device 200c may additionally, or alternatively, be located proximate, adjacent or in contact with the AC/DC power converter 206c or second DC/DC power converter 206d. Additionally, or alternatively, one or more temperature adjustment device 200 may be located proximate the third DC/DC power converter 206e. The temperature adjustment devices 200 may be powered from power generated by the traction electric motor 116, which power is generated thereby during regenerative braking operation. One or more switches $S_1$ (only one illustrated) may be operated in response to control signals CS1 from the controller 120 to selectively couple power to the temperature adjustment devices from the electrical energy storage device 118.

The temperature adjustment devices 200 may take a variety of forms. For example, one or more of the temperature adjustment devices 200 may take the form of Peltier devices, also known as Peltier effect devices. Such devices employ the Peltier effect to create a heat flux between a junction of two different types of materials. The Peltier device is a solid state active heat pump, which in response to a direct current transfers heat against a temperature gradient from one side to the other side of the device. The direction of heat transfer is controlled by the polarity of the applied DC voltage. Hence, such devices are sometimes referred to as Peltier cooler, Peltier heater or thermoelectric heat pump. One or more of the temperature adjustment devices 200 may, for example, take the form of a resistive heater.

One or more of the temperature adjustment devices 200 may include, or be thermally conductively coupled with one or more heat exchange devices 208a-208d (collectively 208). The heat exchange devices 208 may include heat sinks (i.e., a device that transfers heat from a solid material to a fluid such as air), heat spreaders (i.e., plate with relatively high thermal conductivity) and/or or heat pipes (i.e., heat transfer device employing phase transition of a material), alone or in any combination. The heat exchange devices 208 will typically have a relatively large heat dissipation surface area as compared to the temperature adjustment devices 200. For example, the heat exchange devices 208 may include a plurality of fins, for example pin fins to maximize surface area for a given volume. The heat dissipation surfaces of the he heat exchange devices 208 may be positioned relative away from the specific components which are being cooled.

The controller 204 may take a variety of forms which may include one or more integrated circuits, integrated circuit components, analog circuits or analog circuit components. As illustrated the controller 204 includes a microcontroller 220, non-transitory computer- or processor readable memory such as a read only memory (ROM) 222 and/or random access memory (RAM) 224, and may optionally include one or more gate drive circuits 226.

The microcontroller 220 executes logic to control operation of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any of a variety of forms capable of storing processor executable instructions and/or data to implement the control logic. The RAM 224 may take any of a variety of forms capable of temporarily retaining processor executable instructions or data. The microcontroller 220, ROM 222, RAM 224 and optionally gate drive circuit(s) 226 may be coupled by one or more buses (not shown), including power buses, instructions buses, data buses, address buses, etc. Alternatively, the control logic may be implemented in an analog circuit.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive signals from one or more sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$. The controller may use the sensed information in controlling the temperature adjusting devices 200, for example starting heat transfer, stopping heat transfer, increasing a rate of heat transfer or even changing a direction of heat transfer. Such may be accomplished by application of control signals $C_{S1}$-$C_{S3}$ to select switches $SW_1$-$SW_3$. For example, control signals $C_{S1}$-$C_{S3}$ select switches $SW_1$-$SW_3$ to cause power (e.g., direct current) to be supplied to selected ones of the temperature adjustment devices 200, and to set a voltage level of the applied power and even a polarity of the applied powered.

A battery temperature sensor $S_{TB}$ may be positioned to sense a temperature of the main electrical power storage device 118 or ambient environment proximate the main electrical power storage device 118 and provide signals $T_B$ indicative of the sensed temperature.

A battery voltage sensor $S_{VB}$ may be positioned to sense a voltage across the main electrical power storage device 118 and provide signals $V_B$ indicative of the sensed voltage.

A battery charge sensor $S_{IB}$ may be positioned to sense a charge of the main electrical power storage device 118 and provide signals $I_B$ indicative of the sensed charge.

A power converter temperature sensor $S_{TC}$ may be positioned to sense a temperature of one or more of the power converters 206 or the ambient environment proximate the power converter(s) 206 and provide signals $T_C$ indicative of the sensed temperature.

A power converter voltage sensor $S_{VC}$ may be positioned to sense a voltage across one or more of the power converters 206 and provide signals $V_C$ indicative of the sensed voltage.

A power converter charge sensor $S_{IC}$ may be positioned to sense a charge through one or more of the power converters 206 and provide signals $I_C$ indicative of the sensed charge.

A traction motor temperature sensor $S_{TM}$ may be positioned to sense a temperature of the traction electric motor 116 or ambient environment proximate the traction electric motor 116 and provide signals $T_M$ indicative of the sensed temperature.

A traction motor voltage sensor $S_{VM}$ may be positioned to sense a voltage across the main electrical power storage device 116 and provide signals $V_M$ indicative of the sensed voltage.

A traction motor current sensor $S_{IM}$ may be positioned to sense a current flow through the traction motor 116 and provide signals $I_M$ indicative of the sensed current.

A traction motor rotational sensor $S_{RM}$ may be positioned to sense a current flow through the traction motor 116 and provide signals RPM indicative of the sensed rotational speed.

As discussed herein, the controller can use one or more of the sensed conditions to control operation of one or more of the temperature adjusting devices 200.

The controller 204 includes a transmitter and receiver which may be formed or denominated as a transceiver 228, which provides wireless communications with components or systems which are remote from the electric scooter or motorbike 100. The transceiver 228 may take a large variety of forms suitable to provide wireless communications. For example, the transceiver may take the form of a cellular phone chipset (also referred as a radio) and antenna(s) to carry on communications with a remote system via a cellular service provider network. The transceiver 228 may implement wireless communications approaches other than cellular based communications. Communications may include receiving information and/or instructions from a remote system or device, as well as transmitting information and/or instructions or queries to a remote system or device.

The controller 204 may include a global positioning system (GPS) receiver 230, which receives signals from GPS satellites allowing the controller 204 to determine a current location of the scooter or motorbike 100. Any of a large variety of commercially available GPS receivers may be employed. The present location or position may be specified in coordinates, for example a longitude and latitude, typically with an accuracy of under 3 meters. Alternatively, other techniques may be employed for determining the present location or position of the scooter or motorbike 100, for example triangulation based on three or more cellular towers or base stations.

Elevation at a present location may be discernable or determined based on the GPS coordinates. Likewise, elevational changes between a current location and one or more other locations or destinations may be determined using a topographical mapping or other structured format that relates GPS coordinates with elevations. Such may be advantageously employed in better estimating a range of the electric scooter or motorbike 100. Alternatively, or additionally, the electric scooter or motorbike 100 may include an altimeter that detects elevation, or other sensors, for example an accelerometer, that detects changes in elevation. Such may allow potential energy associated with a relative position of the electric scooter or motorbike 100 with respect to hills (e.g., top of hill, bottom of hill) to be taken into account when determining an estimate range. Such may advantageously produce more accurate or estimated range, preventing unnecessary limiting of operational performance. For example, knowledge that the electric scooter or motorbike 100 is at or proximate a top of a large hill may lead to an increase in the determined estimated range, bringing a replacement or replenishment location within the range, and preventing the need to limit operational performance. Alternatively, knowledge that the electric scooter or motorbike 100 is at or proximate a bottom of a large hill may lead to a decrease in the determined estimated range, indicating that a nearest replacement or replenishment location is outside the estimated range, and causing the limiting of operational performance to occur earlier than otherwise, ensuring that the electric scooter or motorbike 100 will reach the replacement or replenishment location.

Figure 3:
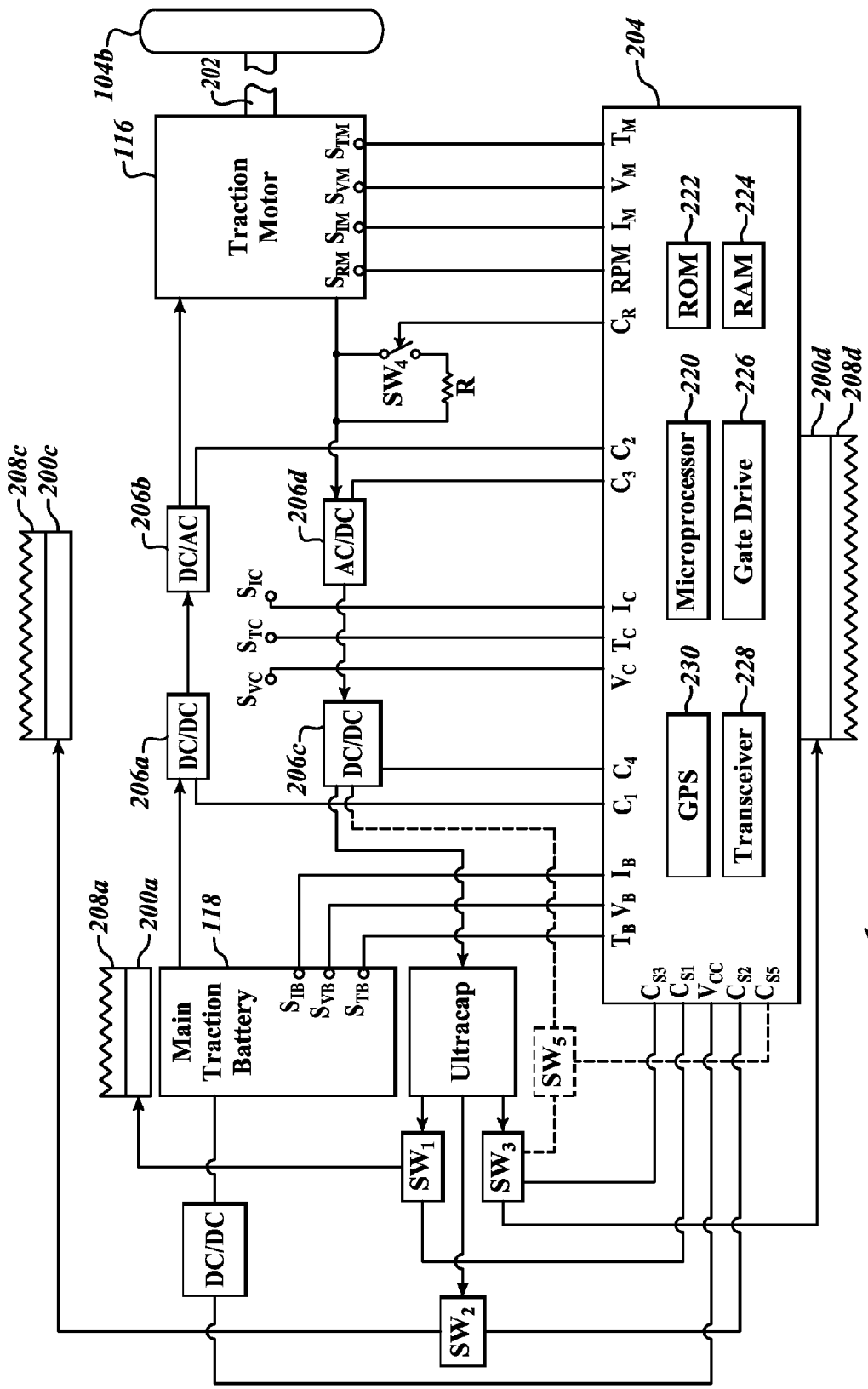
FIG. 3 is a block diagram of some of the components or structures of the scooter or motorbike of FIG. 1, according to another non-limiting illustrated embodiment.

FIG. 3 shows portions of the electric scooter or motorbike 100, according to another illustrated embodiment. In particular, FIG. 3 shows an embodiment which employs an auxiliary electrical energy storage device 300 to supply power generated by the traction electric motor 116 to be used for adjusting or controlling temperature of various components (e.g., electrical energy storage device 118 and/or circuitry) via a number of temperature adjustment devices 200. The auxiliary electrical energy storage device 300, is in addition to the main electrical energy storage device 118 which is still used to supply power to the traction electric motor 116. Many of the structures and/or components are similar, or even identical, to those illustrated and described with reference to FIG. 2, above. Such structures and components will share the same reference numbers as used in FIG. 2, and will not be described in further detail. Only some of the significant differences are described immediately below.

As noted, the embodiment of FIG. 3 adds an auxiliary electrical energy storage device 300. Electrical power generated by the traction electrical motor operating in regenerative braking mode is supplied to the auxiliary electrical energy storage device 300, for example via the AC/DC converter 206c and/or DC/DC converter 206d. The auxiliary electrical energy storage device 300 is illustrated as one or more super- or ultracapacitors, although such can take a variety of forms, for example a chemical battery. Since the auxiliary electrical energy storage device 300 does not drive the traction electric motor 116, greater flexibility is allowed in selecting the form. Thus, the auxiliary electrical energy storage device 300 may be selected based on a desired characteristic, such as performance at the expected voltages, charge capacity, and/or temperatures at which the auxiliary electrical energy storage device 300 will operate. The choice of an ultracapacitor may realize efficiencies over a chemical battery, particularly with respect to discharging and/or charging operations at relatively high ambient temperatures The switches $SW_1$-$SW_3$ are now operable to selectively couple the auxiliary electrical energy storage device 300 to the temperature adjustment devices 200.

The embodiment of FIG. 3 may also include a dump or dissipation resistor R and a switch $SW_4$ operable in response to control signals $C_R$ from the controller 120 to selectively couple the resistor R in parallel between the traction electric motor 116 and the AC/DC power converter 206c. Such may allow excess electrical energy to be dissipated as heat, for example where the energy generated during regenerative braking operation is too much for the auxiliary electrical energy storage device 300.

The embodiment of FIG. 3 may additionally, or alternatively, include a direct coupling switch $SW_5$ which is operable in response to control signals $C_{S5}$ from the controller 120 to provide a direct electrical coupling between the electrical power generated by the traction electric motor operating in regenerative braking mode and the temperature adjusting devices 200 without any intervening batteries or ultracapacitors.

Figure 4:
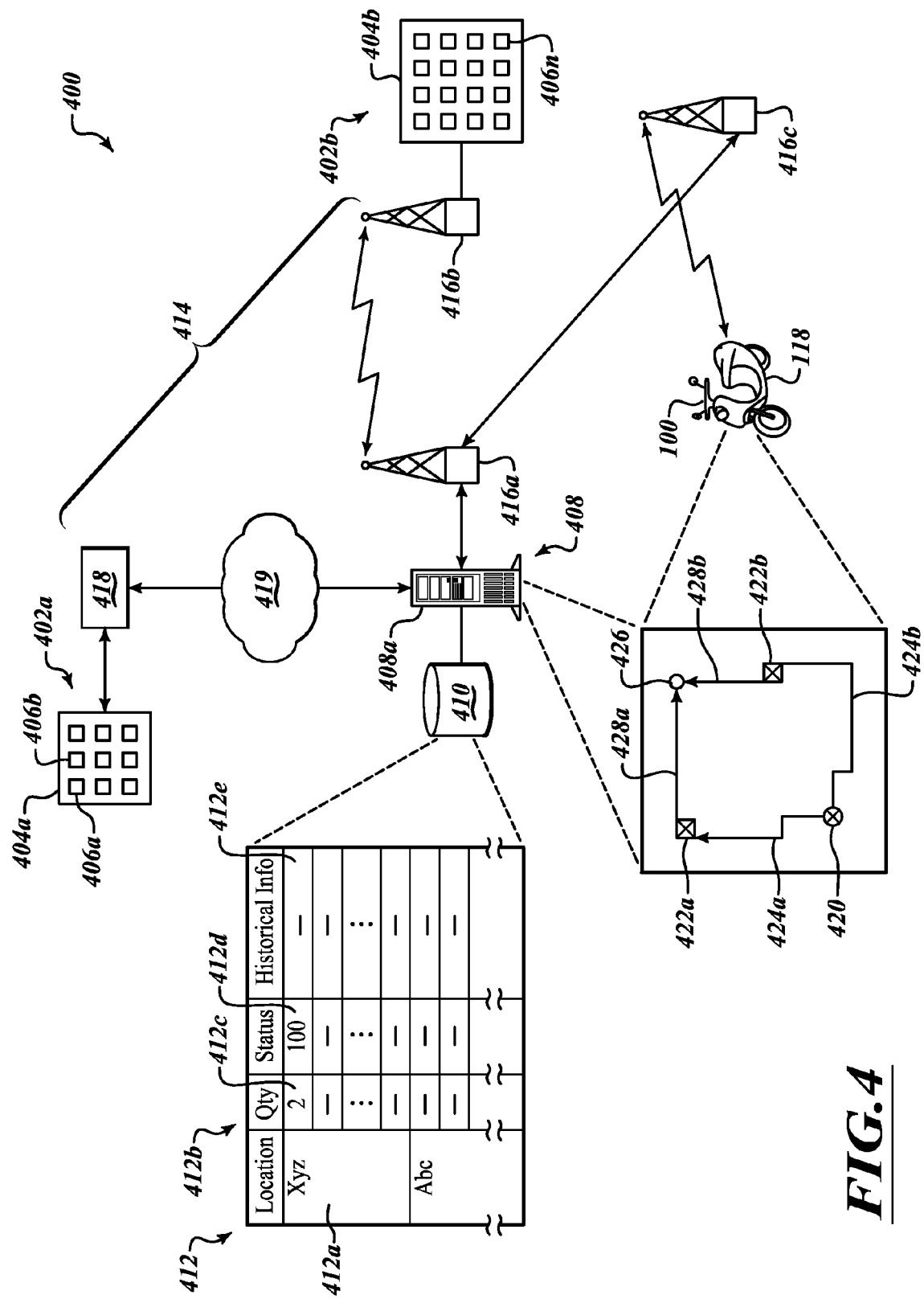
FIG. 4 is a schematic diagram of an environment including one or more scooters or motorbikes, locations for replacing or replenishing an energy or power storage device, and a backend system communicatively coupled by a communications infrastructure, according to one non-limiting illustrated embodiment.

FIG. 4 shows an environment 400 in which the electric scooter or motorbike 100 (only one shown) of FIGS. 1 and 2 may operate, according to one illustrated embodiment.

The environment 400 includes a plurality of locations 402a, 402b (collectively 402, only two shown) at which a main energy storage device may be replaced or replenished. These locations 402 may, for example, include dispensing or vending machines or kiosks 404a, 404b (collectively 404) for collecting, charging and distributing energy or power storage devices 406a, 406b-406n (only three called out, collectively 406). Alternatively, these locations 402 may employ individuals to manually collect, charge and distribute energy or power storage devices 406. Such replacement or replenishment locations 402 may be distributed about a geographic area, for example a city or town, or a county or other region. Typically, each replacement or replenishment location 402 will maintain an inventory 406 of energy or power storage devices, which may be in various charge states and/or conditions. An energy or power storage device 118 on an electric scooter or motorbike 100 may be exchanged for a more fully charged energy or power storage device 406 at the replacement or replenishment locations 402.

The environment 400 includes one or more backend systems 408 including one or more backend servers 408a (only one shown), which is configured to track the locations 402 at which a main energy storage device 118 may be replaced or replenished. The backend system includes a nontransitory medium 410 (e.g., hard disk) which maintains a database or other information structure 412 of the various replacement or replenishment locations 402. Such information may include coordinates 412a of the locations 402, for example specified in longitude and latitude and/or specified by street address. Such may also include a current inventory 412b of energy or power storage devices at a given location 402. The inventory 412b may, for example, specify the number 412c of energy or power storage devices available at the given location 402, a charge condition 412d of one or more of the energy or power storage devices, and/or historical information 412e reflecting the use of one or more of the energy or power storage devices 406, for example an age of the energy or power storage device 406 and/or a number of recharge cycles to which a given energy or power storage device 406 has been subjected.

The environment 400 may include a communications infrastructure 414 which allows or facilitates communications between various components, for example between the backend system 408 or server 408a, the plurality of locations 402 at which a main energy storage device 118 may be replaced or replenished and/or one or more electric scooter or motorbikes 100. The communications infrastructure 414 may take a large variety of forms, and may include different distinct components and systems, for example wired or optical cable components or systems and/or wireless components or systems. For example, the communications infrastructure 414 may include a cellular communications network provided by a cellular communications service provider including base stations 416a, 416b, 416c (collectively 416). Such may allow data communications over wireless infrastructures (shown as zigzagged lines with double headed arrows), for example communications with the electric scooter or motorbike 100. Some of the components may be communicatively coupled over a wired network (shown by solid lines with double headed arrows), for instance Plain Old Telephone Service (POTS) network 418. For instance, fixed components such as the backend system 408 or server 408a and the plurality of locations 402 at which a main energy storage device 118 may be replaced or replenished may be coupled via conventional telephone wires. Alternatively, the backend system 408 or server 408a and the plurality of locations 402 may be communicatively coupled via the Internet 419, or some other network (e.g., extranet, internet), which may employ wired, wireless and/or combinations of wired and wireless communications paths or channels.

In some installations, the backend system 408 or server 408a simply provides requested information regarding the locations 402 and/or inventories 406 to the controllers 204 (FIGS. 2 and 3) of the electric scooter or motorbike 100. The controller 204 processes the received information, as well as information regarding the operation of the electric scooter or motorbike 100 to control the operation of the electric scooter or motorbike 100, as discussed in more detail below. In other installations, the controller 204 (FIGS. 2 and 3) may provide information regarding the operational conditions and present location of the electric scooter or motorbike 100 to the backend system 408 or server 408a. In such an installation, the backend system 408 or server 408a determines whether to limit operation of the electric scooter or motorbike 100, and communicates appropriate instructions to the controller 204 of the electric scooter or motorbike 100 to limit operation accordingly.

Either the controller 204 or the backend system 408 or server 408a determines a travel distance between a present location 420 of the vehicle 100 and one or more destinations 422a, 422b at which a replacement or replenishment of the main energy or power storage device 118 may be obtained. The travel distance represents at least an estimate of a distance that would have to be traversed over roads on which the vehicle 100 is legally allowed to travel. For example, it may not be legally permitted to operate some electric scooters on highways, while some electric scooters may not be suitable for backcountry or off-road operation. The travel distance is represented by a first path 424a to a first one of the locations 422a, and a second path 424b to a second one of the locations 422b. While some embodiments may employ an "as the crow flies" or straight line distance, a distance that accounts for actually impediments is preferred.

The controller 304 or the backend system 408 or server 408a may take into account an actual, final or principal destination 426, which is not a location 422a, 422b at which replacement or replenishment of the main energy or power storage device 118 is available or may be obtained. Such can account for the fact that a rider or vehicle operator would rather not go too far out of their way in seeking a replacement or replenishment of the main energy or power storage device 118. A travel distance between the locations 422a, 422b and the actual, final or principal destination 426 are represented as paths 428a, 428b, respectively. The locations 422a, 422b and/or the actual, final or principal destination 426 may at least in part be defined by coordinates, for instance longitude and latitude. A present location 420 of the vehicle 118 may likewise be specified in coordinates, for example via a GPS receiver. Various software approaches may be employed using map information to calculate the travel distance, again accounting for obstacles and other limitations on the actual travel path. As noted above, such may also account for elevation changes between a present location and one or more destinations. Likewise, various software approaches may be employed using map information to calculate or determine directions along one or more of the paths 424a, 424b, 428a, 428b, to provide to the driver or operator.

Figure 5:
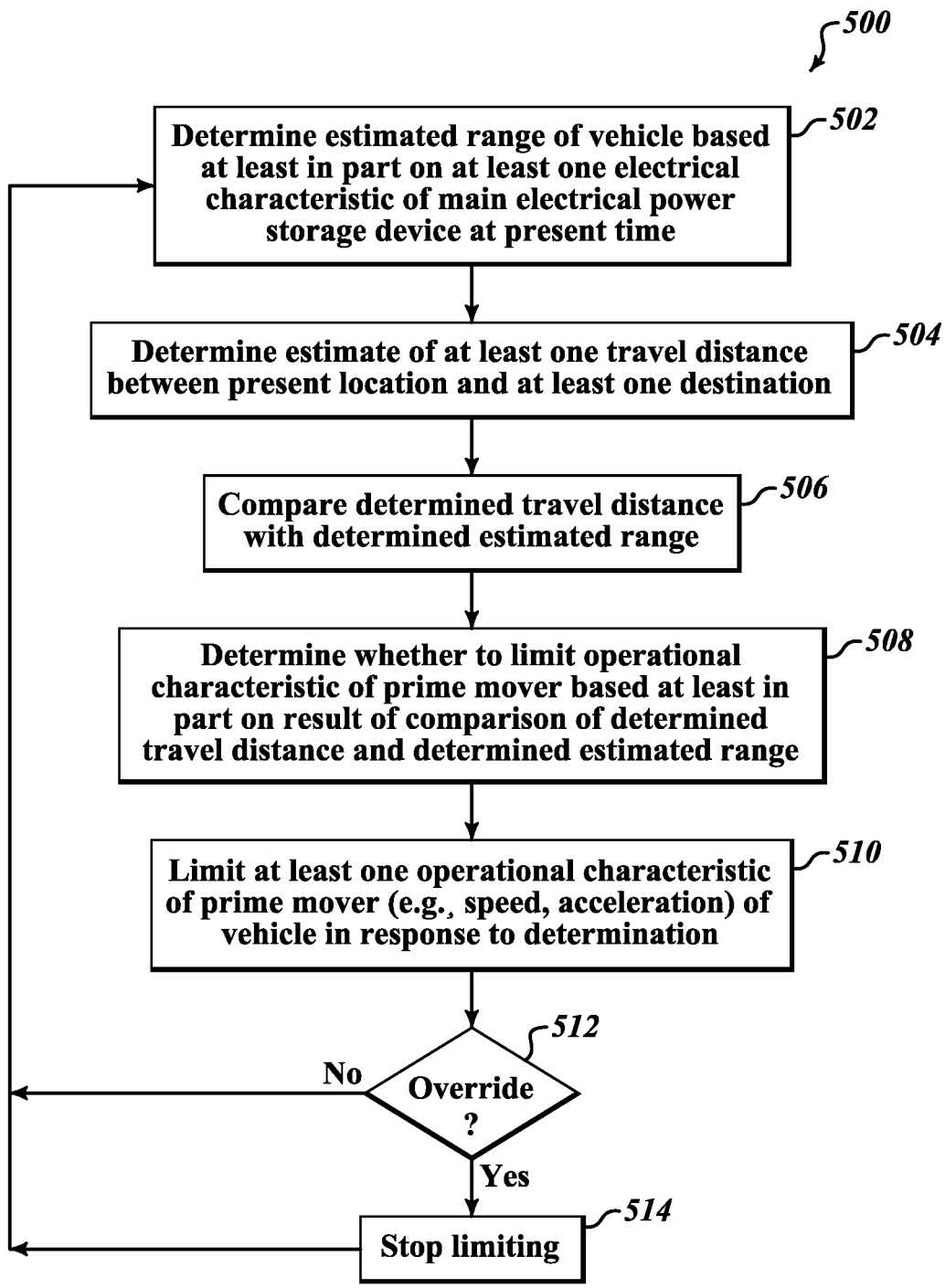
FIG. 5 is a flow diagram showing a high level method of operating the components or structures of FIGS. 2-4 to control operation of a vehicle having a main electrical energy storage device, according to one illustrated embodiment.

FIG. 5 shows a high level method 500 of operating the components or structures of FIGS. 2-4 to implement control of a vehicle having a main electrical energy or power storage device, according to one non-limiting illustrated embodiment.

At 502, a controller of a vehicle or a backend system determines an estimated range of a vehicle based at least in part on at least one electrical characteristic of a main electrical power storage device (e.g., main chemical secondary battery) of the vehicle at a present time. For example, the estimated range may be based on a charge level of the main electrical power storage device, and may take into various other factors related to: the main electrical power storage device (e.g., age, charge cycles), the vehicle (e.g., mileage, weight, drag), a driver of the vehicle (e.g., average speed, acceleration history), and/or the operating environment (e.g., ambient temperature, terrain).

At 504, the controller of the vehicle or the backend system determines at least an estimate of at least one travel distance between a present location of the vehicle and at least one destination at which the main electrical power storage device may be replaced or replenished. For example, the controller of the vehicle or the backend system determines at least an estimate of at least one travel distance between a present location of the vehicle and two or more of the closest locations where replacement energy or power storage devices are inventoried or distributed. As previously noted, there are a variety of ways in which a present location of the vehicle may be ascertained, for instance via a GPS receiver or via triangulation at the controller, at the backend system, or provided by a communications service provider such as a third party cellular service provider. The locations at which electrical power storage devices may be replaced or replenished are typically fixed locations, although new locations may appear from time-to-time, while some locations may close or move. Coordinates for such locations may be maintained in a database or other information storage structure for instance a lookup table.

At 506, the controller of the vehicle or the backend system compares the at least one determined travel distance with the determined estimated range. Such may be a simple comparison or may include some threshold or buffer, for example a safety margin such as 10%. Thus, the controller of the vehicle or the backend system may perform the comparison to determine if the travel distance is more than 90% of the estimated range. Other threshold or safety margin values and percentages may of course be employed. The particular safety margin or percentage may be determined "on the fly" or in real time, for example based on one or more characteristics of the current main electrical power storage device conditions, the vehicle operation or condition, a driver operation or condition, and/or the operating environment conditions.

At 508, the controller of the vehicle or the backend system determines whether to limit operational characteristic of a prime mover and/or vehicle accessories based at least in part on result of comparison of determined travel distance and determined estimated range. Thus, for example if the determined travel distance is more than 90% of the estimated available range, the controller or backend system may determine that vehicle operation should be limited in order extend the estimate range.

At 510, the controller of the vehicle or the backend system limits at least one operational characteristic (e.g., speed, acceleration) of a prime mover of the vehicle (e.g., traction electric motor) and/or operation of electrically powered vehicle accessories in response to determination. As discussed in more detail below, the operational characteristic may be limited by controlling the amount of power (e.g., current and/or voltage) supplied to the prime mover and/or accessory via a power supply such as one or more power converters. Such may be implemented via adjustment of a duty cycle of one or more pulse width modulated gate drive signals applied to one of more active switches of the one or more power converters. Such may additionally, or alternatively, be achieved by adjusting a temperature of the main electrical power storage device.

Optionally at 512, the controller of the vehicle determines if the rider or operator has selected to override the limiting function. For example, the vehicle may include one or more rider or operator operable switches or other controls that allow the rider or operator to override the limiting function, for example where maintaining speed and/or accelerator or some other operating parameter may be deemed essential to safe operation. For instance, the rider or operator may choose to override the limiting when operating on a highway, since the ability to achieve and maintain highway speeds may be important to safe operation. Other reasons for overriding the limiting may include knowledge of the existence of a replacement or replenish power storage device as some other location, for instance an intermediary location. At 514, the controller stops limiting the operation if the rider or operator has selected to override the limiting.

The method 500 may repeat continuously, periodically, or even aperiodically, updating the various conditions or parameters and determining whether or not to limit vehicle operation based on the same.

Figure 6:
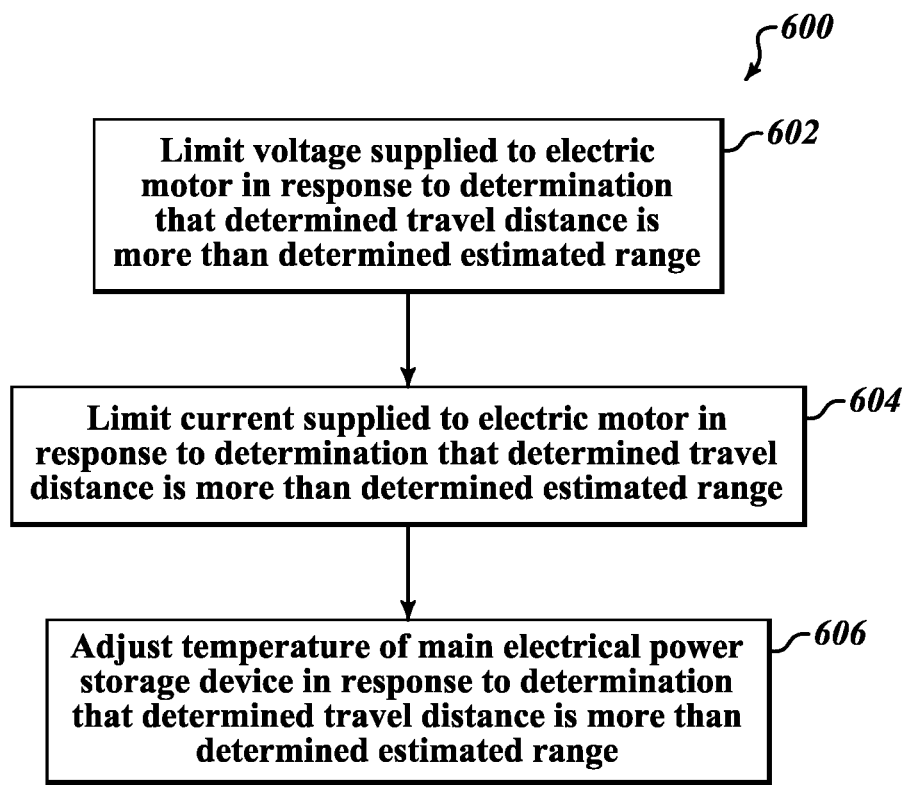
FIG. 6 is a flow diagram showing a low level method of operating the components or structures of FIGS. 2 and 3 to implement control of the vehicle by limiting voltage and/or current and/or adjusting a temperature of the main electrical power or energy storage device according to one non-limiting illustrated embodiment, useful in performing the method of FIG. 5.

FIG. 6 shows a low level method 600 of operating the components or structures of FIGS. 2 and 3 to implement control of the vehicle by limiting voltage and/or current and/or adjusting a temperature of the main electrical power or energy storage device. The method 600 may be useful in performing the method 500 (FIG. 5). The illustrated embodiment refers to an electric motor; however, the description is equally applicable to electric powered vehicle accessories. Further, for electric powered vehicle accessories, rather than limit voltage supplied to an accessory, electric power to the accessory can be disconnected via a switching circuit, to reduce electric energy consumption by the accessory.

At 602, the controller limits a voltage supplied to an electric motor of the vehicle in response to a determination that the determined travel distance is more than a determined estimated range. Such may be implemented via adjustment of a duty cycle of one or more pulse width modulated gate drive signals applied to one of more active switches of the one or more power converters. Such may additionally, or alternatively, be achieved by adjusting a temperature of the main electrical power storage device.

At 604, the controller limits a current supplied to the electric motor in response to a determination that the determined travel distance is more than the determined estimated range. Such may be implemented via adjustment of a duty cycle of one or more pulse width modulated gate drive signals applied to one of more active switches of the one or more power converters. Such may additionally, or alternatively, be achieved by adjusting a temperature of the main electrical power storage device.

At 606, the controller causes a temperature of the main electrical power storage device to be adjusted (e.g., increased, decreased) in response to a determination that a determined travel distance is more than the determined estimated range. Such may, for example, be achieved via activation of a temperature adjustment device, for instance a Peltier device to transport heat either away from, or alternatively towards, the main electrical power storage device. Such may also be less directly achieved by controlling a current draw of the main electrical power storage device. Notably, discharging and/or charging of a battery may significantly affect temperature of the battery.

The controller may, for example, limit operation by reducing responsiveness to throttle inputs. For instance, throttle input may be damped such that a given throttle input produces as smaller change in speed and/or acceleration when operating in a "best efforts" or limited operational mode than during a normal operational mode. Also for instance, responsiveness to throttle changes may be delayed by some time, for example a quarter of a second when operating in the "best efforts" or limited operational mode than during the normal operational mode. The controller implements a governor, to limit the operational performance in order to achieve a desired range, which may allow the scooter or motorbike to reach an desired destination, such as a location where a power storage device may be replaced or replenished. The operational modes may be indicated to the driver or operator, for example via a green and a red LED. An amber LED may be used to indicate a condition in which limiting has not yet been triggered, but conditions indicate that limiting may become necessary.

The reduction in operational performance may be termed "limp home" mode, since such provides sufficient power and resources to reach a desired destination, without supplying full power and resources. As part of limiting the operation, in addition to limiting speed and/or acceleration the controller may shut down, or reduce power consumption of other "non-necessary" or "non-essential" components, such as components not necessary to operation and/or safety. For example, electrical power to an entertainment system may be reduced, while power to turn indicators, headlamps and brake lights is maintained.

Figure 7:
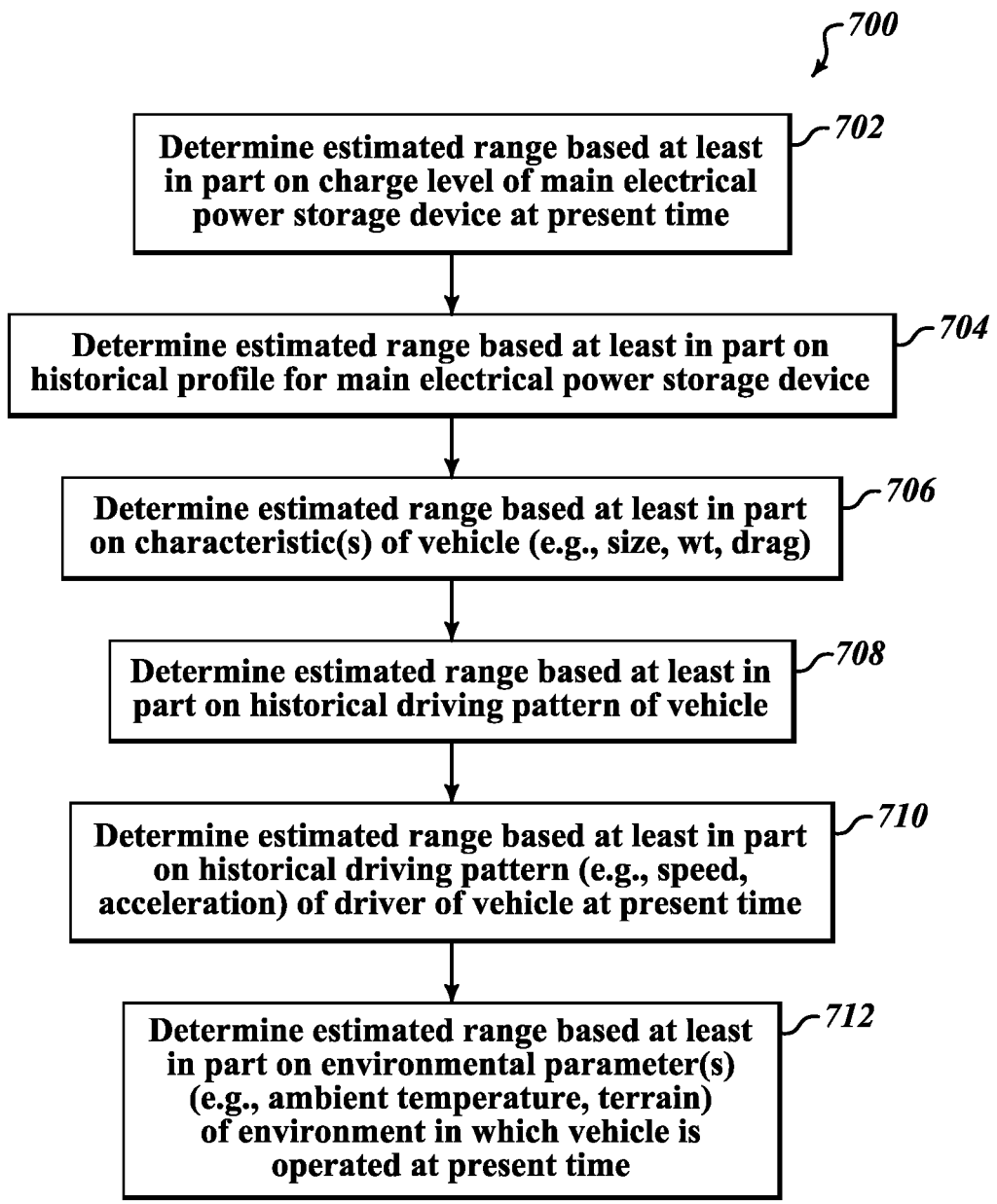
FIG. 7 is a flow diagram showing a low level method of operating the components or structures of FIGS. 2-4 to determine an estimated range according to one non-limiting illustrated embodiment, useful in performing the method of FIG. 5.

FIG. 7 shows a low level method 700 of operating the components or structures of FIGS. 2-4 to determine an estimated range, according to one non-limiting illustrated embodiment. The method 700 may be useful in performing the method 500 (FIG. 5).

At 702, the controller of the vehicle or the backend system determines an estimated range of the vehicle based at least in part on a charge level of the main electrical power storage device at a present time.

At 704, the controller of the vehicle or the backend system determines the estimated range of the vehicle based at least in part on historical profile for the main electrical power storage device. Such may take into account the age of the main electrical power storage device, number of recharge cycles the main electrical power storage device has been subjected to, and/or other aspects such as how hard the main electrical power storage device has been driven, including how often the main electrical power storage device has been fully depleted or almost fully depleted.

At 706, the controller of the vehicle or the backend system determines the estimated range of the vehicle based at least in part on one or more characteristics of the vehicle. The vehicle characteristics may take a variety of forms, for instance, average mileage, size, vehicle weight, motor size (e.g., HP), drag coefficient, etc.

At 708, the controller of the vehicle or the backend system determines the estimated range of the vehicle based at least in part on a historical driving pattern of the vehicle. Such may include an average speed and/or average acceleration during vehicle operation over some period of time. The operational characteristics may be weighted, for example more recent operational characteristics may have more of an influence than less recent operational characteristics.

At 710, the controller of the vehicle or the backend system determines the estimated range of the vehicle based at least in part on a historical driving pattern of a current driver of the vehicle at a present time. The historical driving pattern may include information indicative of speed or average speed, acceleration or tendency toward "jack rabbit" starts, extended periods of idling, or even a tendency to make incorrect turns. Such can include other information which may be relevant to predicting range. The driver may be identified in any of a large variety of ways. For example, each driver of the vehicle may have a key fob with a wireless transponder that stores a unique identifier. Such may be read by a reader (e.g., RFID interrogator) of the vehicle whenever the key fob is within close proximity of the vehicle.

At 712, the controller of the vehicle or the backend system determines the estimated range based at least in part on one or more environmental parameters of an environment in which vehicle is operated at the present time. The environmental parameters may take a variety of forms. For example, an ambient temperature may be sensed by a temperature sensor such as a thermocouple. A terrain of the environment may be sensed using one or more accelerometers, gyroscopes, or from mapped information such as topographical information stored in a database or other information structure. Additionally, or alternatively the terrain may be determined based on mapping data, for instance topographic mapping data. Such may allow elevational changes between a present location and one or more destinations to be taken into account when determining an estimated range. For example, knowledge that the electric scooter or motorbike 100 is at or proximate a top of a large hill may lead to an increase in the determined estimated range, bringing a replacement or replenishment location within the range, and preventing the need to limit operational performance. Alternatively, knowledge that the electric scooter or motorbike 100 is at or proximate a bottom of a large hill may lead to a decrease in the determined estimated range, indicating that a nearest replacement or replenishment location is outside the estimated range, and causing the limiting of operational performance to occur earlier than otherwise, ensuring that the electric scooter or motorbike 100 will reach the replacement or replenishment location.

The method 700 may execute one or more of the acts 702-712. The acts 702-712 may be executed sequentially or concurrently. The acts 702-712 may, for example be executed by solving one or more equations with the various conditions as parameters. Alternatively, one or more lookup tables may be employed.

Figure 8:
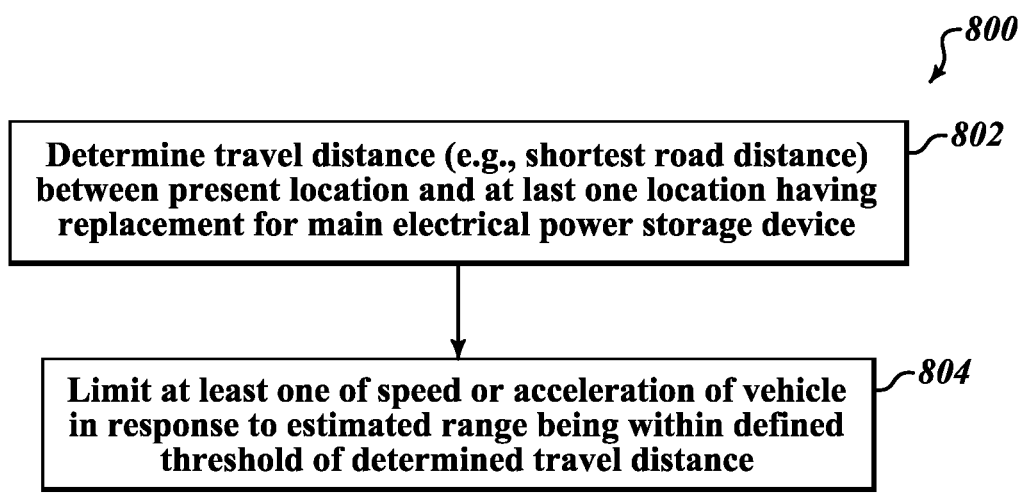
FIG. 8 is a flow diagram showing a low level method of operating the components or structures of FIGS. 2-4 to implement control of the vehicle according to one non-limiting illustrated embodiment, useful in performing the method of FIG. 5.

FIG. 8 shows a low level method 800 of operating the components or structures of FIGS. 2-4 to implement control of a vehicle according to one non-limiting illustrated embodiment. The method 800 may be useful in performing the method 500 (FIG. 5).

At 802, the controller of the vehicle or the backend system determines a travel distance (e.g., shortest road distance) between a present location of the vehicle and at least one location having a replacement or replenishment for the main electrical power storage device. The present location of the vehicle may, for example, be determined using GPS coordinates provided by a GPS receiver. Alternatively, or additionally, the present location of the vehicle may, for example, be determined via triangulation, performed by the controller, the backend system, or via a third party communications service provider's system.

At 804 the controller of the vehicle limits at least one of speed or acceleration of the vehicle in response to the estimated range being within a defined threshold of the determined travel distance. Such may, for example, be implemented via an adjustment of a duty cycle of one or more pulse width modulated gate drive signals applied to one or more active switches of the one or more power converters. Such may additionally, or alternatively, be achieved by adjusting a temperature of the main electrical power storage device. Such adjustment may be made to, for example, limit a speed of the vehicle to a defined maximum speed and/or to limit an acceleration of the vehicle to a defined maximum acceleration, thereby ensuring maximum range given the current condition of the electrical energy or power storage device, and various other conditions.

The method 800 may repeat continuously, periodically, or even aperiodically, updating the various conditions or parameters, determining whether or not to limit vehicle operation based on the same, and implementing the limiting as dictated by the determination.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314, filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038, filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,054, filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390, filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343, filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064, filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of power system for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a vehicle having a prime mover powered by a main electrical power storage device, the method comprising:
   determining an estimated range of the vehicle based at least in part on at least one electrical characteristic of the main electrical power storage device at a present time;
   determining at least an estimate of at least one travel distance between a present location and at least one destination;
   comparing the determined travel distance with the determined estimated range, wherein the comparing the determined travel distance with the determined estimated range includes determining whether the estimated range is within a defined threshold of the determined travel distance, the defined threshold determined based on one or more of: operation or condition of the vehicle at the present time and operation or condition of a driver of the vehicle at the present;
   receiving information regarding a determination made by a backend system located remotely from the vehicle whether to limit an operational characteristic of the prime mover of the vehicle based at least in part on a result of the comparison of the determined travel distance and the determined estimated range, wherein the determining an estimated range of the vehicle based at least in part on at least one electrical characteristic of the main electrical power storage device at a present time includes the backend system located remotely from the vehicle determining the estimated range of the vehicle based at least in part on a historical profile for the main electrical power storage device;
   receiving a determination made by the backend system located remotely from the vehicle to not limit the operational characteristic of the prime mover of the vehicle based at least in part on a result of the comparison of the determined travel distance and the determined estimated range;
   determining a new estimated range of the vehicle;
   determining a new estimate of at least one travel distance between a new present location and at least one new destination;
   receiving a determination made by the backend system located remotely from the vehicle to limit an operational characteristic of the prime mover of the vehicle based at least in part on a comparison between the determined travel distance with the determined new estimated range; and
   limiting the operational characteristic of the prime mover of the vehicle in response to the determination made by the backend system located remotely from the vehicle to limit the operational characteristic of the prime mover of the vehicle.

2. The method of claim 1, further comprising:
   limiting, by a controller in a control circuit in the vehicle, at least one operational characteristic of the prime mover of the vehicle in response to the determination made by the backend system located remotely from the vehicle.

3. The method of claim 2 wherein limiting at least one operational characteristic of the prime mover of the vehicle in response to the determination made by the backend system located remotely from the vehicle includes limiting a speed of the vehicle.

4. The method of claim 2 wherein limiting at least one operational characteristic of the prime mover of the vehicle in response to the determination made by the backend system located remotely from the vehicle includes limiting an acceleration of the vehicle.

5. The method of claim 1 wherein the prime mover is an electric motor, and further comprising:
   limiting, by a controller in a control circuit in the vehicle, a voltage supplied to the electric motor of the vehicle in response to the backend system located remotely from the vehicle determining that the determined travel distance is more than the determined estimated range.

6. The method of claim 1 wherein the prime mover is an electric motor, and further comprising:
   limiting, by a controller in a control circuit in the vehicle, a current supplied to the electric motor of the vehicle in response to the backend system located remotely from the vehicle determining that the determined travel distance is more than the determined estimated range.

7. The method of claim 1, further comprising:
   adjusting, by a controller in a control circuit in the vehicle, a temperature of the main electrical power storage device in response to the backend system located remotely from the vehicle determining that the determined travel distance is more than the determined estimated range.

8. The method of claim 1, further comprising:
   ceasing, by a controller in a control circuit in the vehicle, a supply of power to at least one non-essential component of the vehicle in response to the backend system located remotely from the vehicle determining that the determined travel distance is more than the determined estimated range.

9. The method of claim 1 wherein determining an estimated range of the vehicle based at least in part on at least one electrical characteristic of the main electrical power storage device at a present time includes the backend system located remotely from the vehicle determining the estimated range of the vehicle based at least in part on a charge level of the main electrical power storage device at the present time.

10. The method of claim 1 wherein determining an estimated range of the vehicle based at least in part on at least one electrical characteristic of the main electrical power storage device at a present time includes the backend system located remotely from the vehicle determining the estimated range of the vehicle based at least in part on at least one characteristic of the vehicle.

11. The method of claim 1 wherein determining an estimated range of the vehicle based at least in part on at least one electrical characteristic of the main electrical power storage device at a present time includes the backend system located remotely from the vehicle determining the estimated range of the vehicle based at least in part on a historical driving pattern of the vehicle.

12. The method of claim 1 wherein determining an estimated range of the vehicle based at least in part on at least one electrical characteristic of the main electrical power storage device at a present time includes the backend system located remotely from the vehicle determining the estimated range of the vehicle based at least in part on a historical driving pattern of a driver of the vehicle at the present time.

13. The method of claim 1 wherein determining an estimated range of the vehicle based at least in part on at least one electrical characteristic of the main electrical power storage device at a present time includes the backend system located remotely from the vehicle determining the estimated range of the vehicle based at least in part on a least one environmental parameter of an environment in which the vehicle is operated at the present time.

14. The method of claim 1 wherein determining at least an estimate of at least one travel distance between a present location and at least one destination includes the backend system located remotely from the vehicle determining a travel distance between the present location and at least one location having a replacement for the main electrical power storage device.

15. The method of claim 1 wherein determining at least an estimate of at least one travel distance between a present location and at least one destination includes the backend system located remotely from the vehicle determining a shortest distance between the present location and the at least one destination on roads along which the vehicle may travel.

16. The method of claim 1 wherein determining at least an estimate of at least one travel distance between a present location and at least one destination includes the backend system located remotely from the vehicle accounting for at least one elevational change between the present location and the at least one destination.

17. The method of claim 1 wherein comparing the determined travel distance with the determined estimated range includes the backend system located remotely from the vehicle determining whether the estimated range is within the defined threshold of the determined travel distance.

18. The method of claim 17 wherein the determination made by the backend system located remotely from the vehicle of whether to limit an operational characteristic of the prime mover of the vehicle based at least in part on a result of the comparison of the determined travel distance and the determined estimated range includes a determination made by the backend system located remotely from the vehicle whether to limit at least one of a speed or an acceleration of the vehicle in response to the estimated range being within the defined threshold of the determined travel distance.

19. A vehicle, comprising:
a prime mover coupled to drive at least one wheel of the vehicle;
a main electrical power storage device that stores power;
a power supply coupled and operable to selectively transfer electrical power between the main electrical power storage device and the prime mover; and
a controller communicatively coupled to control the power supply, wherein the controller receives a determination made by a backend system located remotely from the vehicle to not limit an operational characteristic of the prime mover of the vehicle based at least in part on a result of a comparison of a determined travel distance and a determined estimated range made by the backend system located remotely form the vehicle, wherein comparison of the determined travel distance with the determined estimated range includes a determination of whether the estimated range is within a defined threshold of the determined travel distance, the defined threshold determined based on one or more of: operation or condition of the vehicle at the present time and operation or condition of a driver of the vehicle at the present time, wherein the controller limits at least one operational characteristic of the prime mover of the vehicle in response to a result of a determination by the backend system located remotely from the vehicle to limit the operational characteristic of the prime mover of the vehicle based on a determination made of a new estimated range of the vehicle based at least in part on a historical profile for the main electrical power storage device and a comparison by the backend system located remotely from the vehicle of the new determined estimated range of the vehicle at a present time and a new determined travel distance between a present location of the vehicle and at least one destination.

20. The vehicle of claim 19 wherein the controller further:
sends information to the backend system located remotely from the vehicle for the backend system to determine the estimated range of the vehicle based at least in part on at least one electrical characteristic of the main electrical power storage device at the present time;
sends information to the backend system located remotely from the vehicle for the backend system to determine the travel distance between a present location and at least one destination; and
receives information from the backend system located remotely from the vehicle as result of a determination made by the backend system of whether to limit the operational characteristic of the prime mover of the vehicle based at least in part on the result of the comparison by the backend system located remotely from the vehicle of the determined travel distance and the determined estimated range.

21. The vehicle of claim 19 wherein the prime mover is an electric motor and the controller applies control signals to the power supply that limit a voltage supplied to the electric motor of the vehicle in response to a determination by the backend system of whether to limit the operational characteristic.

22. The vehicle of claim 19 wherein the prime mover is an electric motor and the controller applies control signals to the power supply that limit a current supplied to the electric motor of the vehicle in response to a determination by the backend system of whether to limit the operational characteristic.

23. The vehicle of claim 19 wherein the controller ceases a supply of power to at least one non-essential component of the vehicle in response to a determination by the backend system of whether to limit the operational characteristic.

24. The vehicle of claim 19 wherein the backend system determines the estimated range of the vehicle based at least in part on a charge level of the main electrical power storage device at the present time of whether to limit the operational characteristic.

25. The vehicle of claim 19 wherein the backend system determines the estimated range of the vehicle based at least in part on at least one characteristic of the vehicle.

26. The vehicle of claim 19 wherein the backend system determines the estimated range of the vehicle based at least in part on a historical driving pattern of the vehicle.

27. The vehicle of claim 19 wherein the backend system determines the estimated range of the vehicle based at least in part on a historical driving pattern of a driver of the vehicle at the present time.

28. The vehicle of claim 19 wherein the backend system determines the estimated range of the vehicle based at least in part on a least one environmental parameter of an environment in which the vehicle is operated at the present time.

29. The vehicle of claim 19 wherein the backend system determines the estimated range of the vehicle based at least in part on at least one elevational change between the present location and the at least one destination.

30. The vehicle of claim 19 wherein the controller determines the travel distance between the present location and at least one location having a replacement for the main electrical power storage device.

31. The vehicle of claim 19 wherein the controller determines a shortest distance between the present location and the at least one destination along roads along which the vehicle may travel.

32. The vehicle of claim 19 wherein the controller determines whether the estimated range is within the defined threshold of the determined travel distance.

33. The vehicle of claim 19 wherein the controller limits at least one of a speed or an acceleration of the vehicle in response to the estimated range being within the defined threshold of the determined travel distance.

34. The vehicle of claim 19, wherein:
the controller determines whether an operator of the vehicle has selected to override the limiting of the at least one operational characteristic of the prime mover of the vehicle that was performed in response to the determination by the backend system located remotely from the vehicle to limit the operational characteristic of the prime mover of the vehicle; and
if the controller determines that the operator of the vehicle has selected to override the limiting of the at least one operational characteristic of the prime mover of the vehicle, then the controller stops the limiting of the at least one operational characteristic of the prime mover of the vehicle in response to the determination that the operator of the vehicle has selected to override the limiting of the at least one operational characteristic of the prime mover of the vehicle.

35. The vehicle of claim 34, further comprising:
an operable control that allows the operator to make the selection to override the limiting of the at least one operational characteristic of the prime mover of the vehicle that was performed in response to the determination by the backend system located remotely from the vehicle.

36. A method in a backend system for limiting vehicle operation located remotely from the vehicle, the method comprising:
comparing, by a controller in the backend system for limiting vehicle operation located remotely from the vehicle, a determined estimated range of the vehicle with a determined travel distance between a present location of the vehicle and at least one destination of the vehicle, wherein comparing the determined travel distance with the determined estimated range includes determining whether the estimated range is within a defined threshold of the determined travel distance, the defined threshold determined based on one or more of: operation or condition of the vehicle at the present time and operation or condition of a driver of the vehicle at the present time; and
determining, by the controller in the backend system for limiting vehicle operation located remotely from the vehicle, to not limit an operational characteristic of the prime mover of the vehicle based at least in part on a historical profile for a-the main electrical power storage device of the vehicle and a result of the comparison of the determined estimated range and the determined travel distance;
sending, by the controller in the backend system for limiting vehicle operation located remotely from the vehicle, the determination made by the backend system to not limit the operational characteristic of the prime mover of the vehicle;
comparing, by the controller in the backend system for limiting vehicle operation located remotely from the vehicle, a new determined estimated range of the vehicle with a new determined travel distance between a new present location of the vehicle and at least one destination of the vehicle;
determining, by the controller in the backend system for limiting vehicle operation located remotely from the vehicle, to limit the operational characteristic of the prime mover of the vehicle based at least in part on the historical profile for a main electrical power storage device of the vehicle and a result of the comparison of the new determined estimated range and the new determined travel distance; and
limiting, by the controller in the backend system for limiting vehicle operation located remotely from the vehicle, at least one operational characteristic of the prime mover of the vehicle in response to the determination made by the backend system to limit the operational characteristic of the prime mover of the vehicle.

37. The method of claim 36, wherein the limiting includes:
sending information from the backend system to the vehicle to cause the vehicle to limit the operational characteristic of the prime mover in response to the determination of whether to limit an operational characteristic of the prime mover of the vehicle made by the backend system.

38. The method of claim 36, further comprising:
determining, by a controller in the backend system for limiting vehicle operation located remotely from the vehicle, the estimated range of the vehicle based at least in part on at least one electrical characteristic of a main electrical power storage device of the vehicle at a present time.

39. The method of claim 36, further comprising:
determining, by a controller in the backend system for limiting vehicle operation located remotely from the vehicle, at least an estimate of at least one travel distance between the present location of the vehicle and the at least one destination of the vehicle.

40. A method of operating a vehicle having a prime mover powered by a main electrical power storage device, the method comprising:

determining a current status of the main electrical power storage device; and determining whether to limit an operational characteristic of the prime mover of the vehicle based at least in part on a result of the determined current status of the main electrical power storage device and a determination of whether an estimated range of the vehicle at a present time is within a defined threshold of a determined travel distance, the defined threshold determined based on one or more of: operation or condition of the vehicle at the present time and operation or condition of a driver of the vehicle at the present time, wherein the determination of whether to limit an operational characteristic of the prime mover of the vehicle is a determination made by a backend system located remotely from the vehicle to not limit the operational characteristic of the prime mover of the vehicle.

41. The method of claim 40 wherein the status of the main electrical power storage device is regarding a current charge condition of the main electrical power storage device.

42. The method of claim 40 wherein the determination of whether to limit an operational characteristic of the prime mover of the vehicle based at least in part on a result of the determined current status of the main electrical power storage device is made by the backend system located remotely from the vehicle.

* * * * *